US010184238B2

(12) United States Patent
Hull

(10) Patent No.: US 10,184,238 B2
(45) Date of Patent: Jan. 22, 2019

(54) FLOOR DRAIN ASSEMBLY AND METHOD

(71) Applicant: Oatey Co., Cleveland, OH (US)

(72) Inventor: Eric G Hull, Avon Lake, OH (US)

(73) Assignee: OATEY CO., Cleveland, OH (US)

(*) Notice: Subject to any disclaimer, the term of this patent is extended or adjusted under 35 U.S.C. 154(b) by 353 days.

(21) Appl. No.: 15/226,075

(22) Filed: Aug. 2, 2016

(65) Prior Publication Data
US 2016/0340886 A1 Nov. 24, 2016

Related U.S. Application Data

(63) Continuation of application No. 13/748,180, filed on Jan. 23, 2013, now Pat. No. 9,422,708.

(60) Provisional application No. 61/589,556, filed on Jan. 23, 2012.

(51) Int. Cl.
B23P 15/00 (2006.01)
E03F 5/04 (2006.01)

(52) U.S. Cl.
CPC ............ *E03F 5/0409* (2013.01); *B23P 15/00* (2013.01); *E03F 5/041* (2013.01); *E03F 5/0407* (2013.01); *E03F 2005/0412* (2013.01); *E03F 2005/0413* (2013.01); *E03F 2005/0414* (2013.01); *Y10T 29/49826* (2015.01)

(58) Field of Classification Search
CPC ........... Y10T 29/49428; Y10T 29/4943; B23P 2700/00; B23P 15/00
See application file for complete search history.

(56) References Cited

U.S. PATENT DOCUMENTS

| | | | |
|---|---|---|---|
| 1,766,621 A | 6/1930 | Wells |
| 1,779,936 A | 10/1930 | Hess |
| 1,802,481 A | 4/1931 | Reginald |
| 1,805,816 A | 5/1931 | Fleming |
| 1,873,275 A | 8/1932 | Boosey |
| 2,003,770 A | 6/1935 | Goodhart |
| 2,161,783 A | 6/1939 | Huber |
| 2,190,532 A | 2/1940 | Lukomski |
| 2,222,807 A | 11/1940 | Burr |
| 3,445,973 A | 5/1969 | Stone |

(Continued)

FOREIGN PATENT DOCUMENTS

WO WO 2013/112560 8/2013

OTHER PUBLICATIONS

International Patent Application No. PCT/US2013/022713: International Search Report and Written Opinion dated Mar. 22, 2013, 22 pages.

(Continued)

*Primary Examiner* — Jason L Vaughan
*Assistant Examiner* — Amanda J Meneghini
(74) *Attorney, Agent, or Firm* — Baker & Hostetler LLP

(57) ABSTRACT

The present invention relates to an assembly for providing a drain in a floor. The drain assembly includes a drain conduit, a strainer and an adaptor. The drain conduit has an inner, surface that defines a fluid flow path, and an outer surface. The strainer is disposed above the drain conduit and has openings in fluid communication with the fluid flow path of the drain conduit. The adaptor may be securable in the drain conduit and may be connected to the strainer. Prior to securing the adaptor in the drain conduit, a position of the adaptor in the drain conduit may be moveable to allow a top surface of the strainer to be substantially aligned with the floor. A method of assembly is also disclosed.

12 Claims, 47 Drawing Sheets

(56) References Cited

U.S. PATENT DOCUMENTS

| | | | |
|---|---|---|---|
| 4,207,632 A | 6/1980 | Savell, Jr. et al. |
| 4,257,892 A | 3/1981 | Boersma |
| 4,794,654 A | 6/1989 | Diethelm |
| 4,879,771 A | 11/1989 | Piskula |
| 5,376,264 A | 12/1994 | Betancourt |
| 6,350,373 B1 | 2/2002 | Sondrup |
| 6,381,775 B1 | 5/2002 | Sondrup |
| 7,735,512 B1 | 6/2010 | Ismert et al. |
| 8,347,906 B1 | 1/2013 | Ismert et al. |
| 9,322,157 B1 | 4/2016 | Ismert |
| 2006/0283792 A1 | 12/2006 | McCallum |
| 2011/0173747 A1 | 7/2011 | Evans et al. |
| 2012/0199215 A1 | 8/2012 | Cohen |
| 2013/0193042 A1 | 8/2013 | Hull |

OTHER PUBLICATIONS

Oatey SCS, "Supply Chain Services Catalog, Front/Back Cover", 2012, pp. 2-4, pp. 73-86, pp. 201-229.

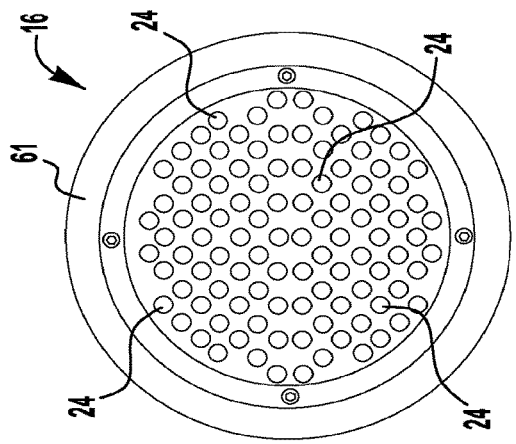
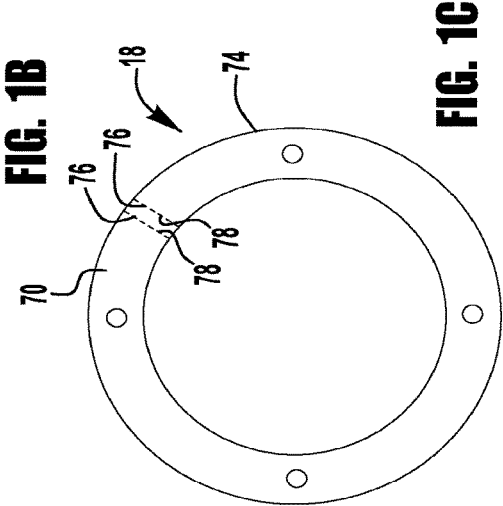
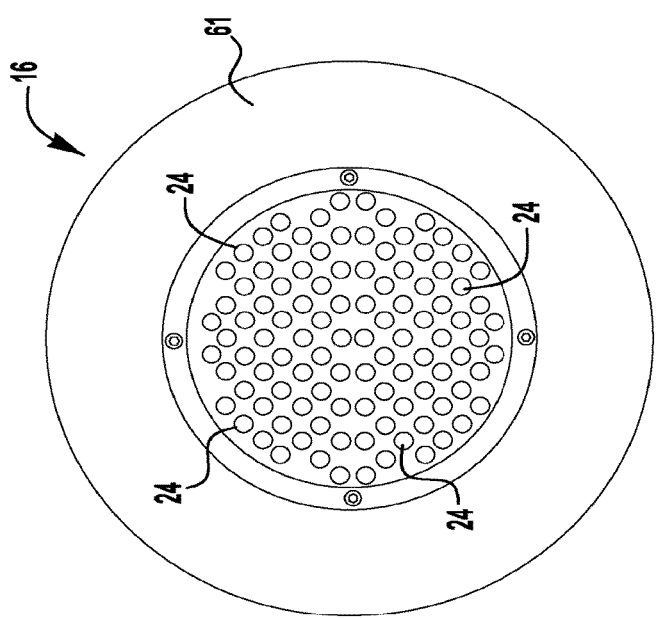
FIG. 1B
FIG. 1C
FIG. 1A

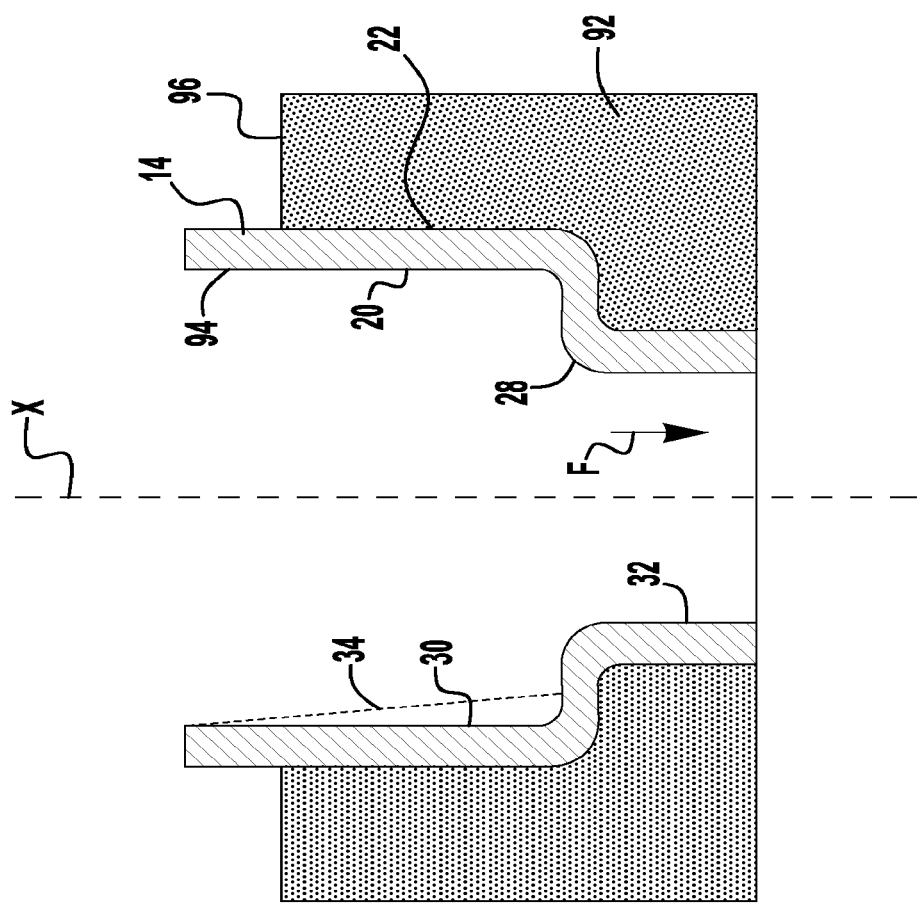

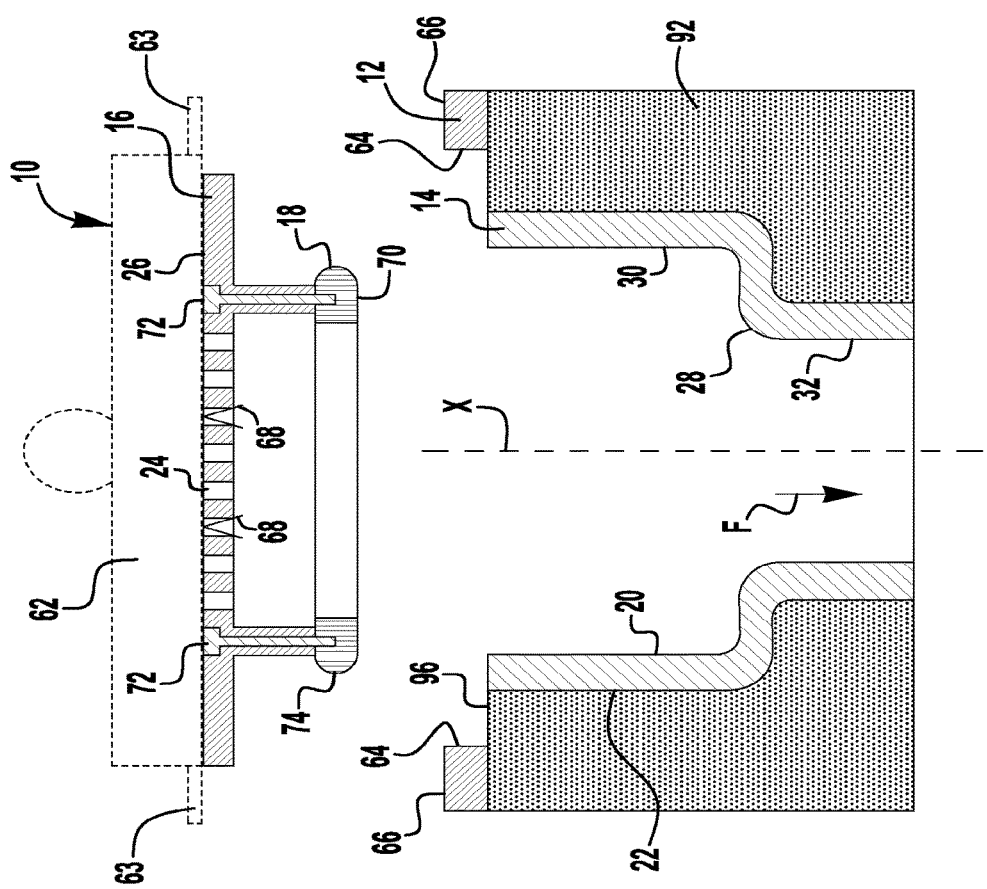

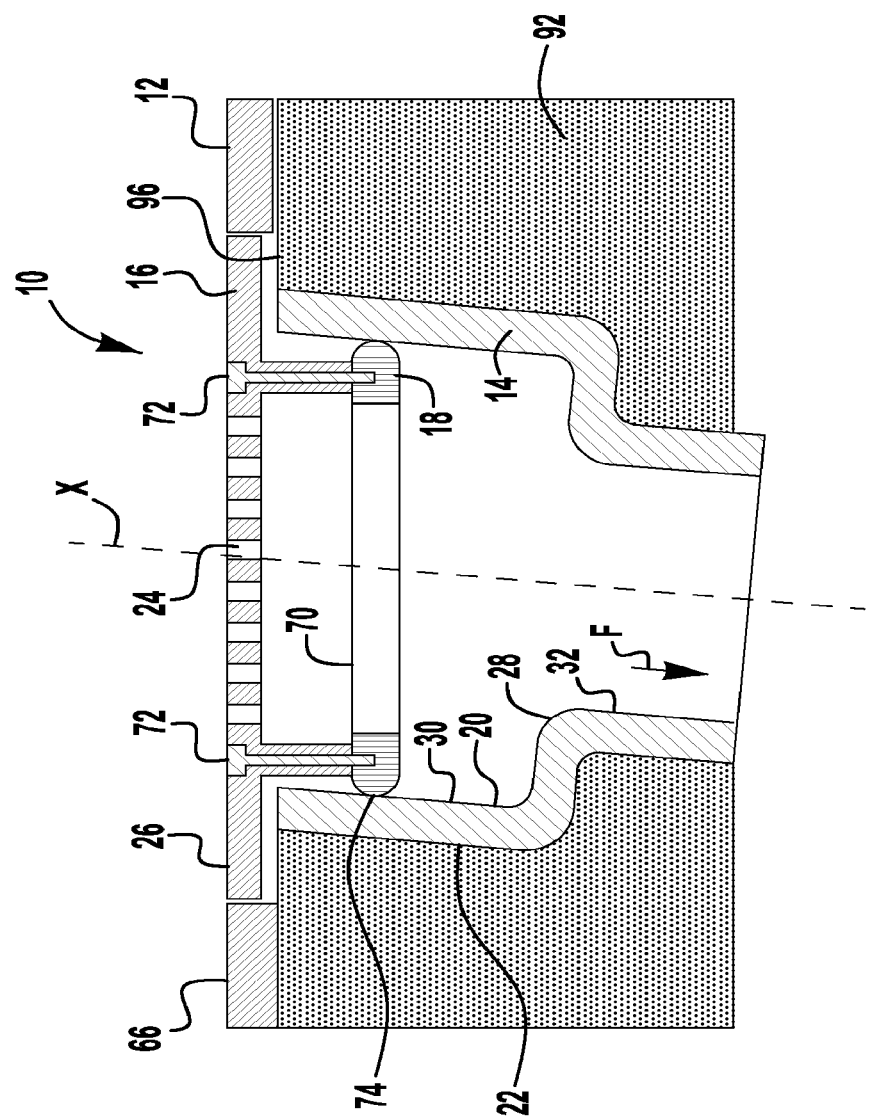

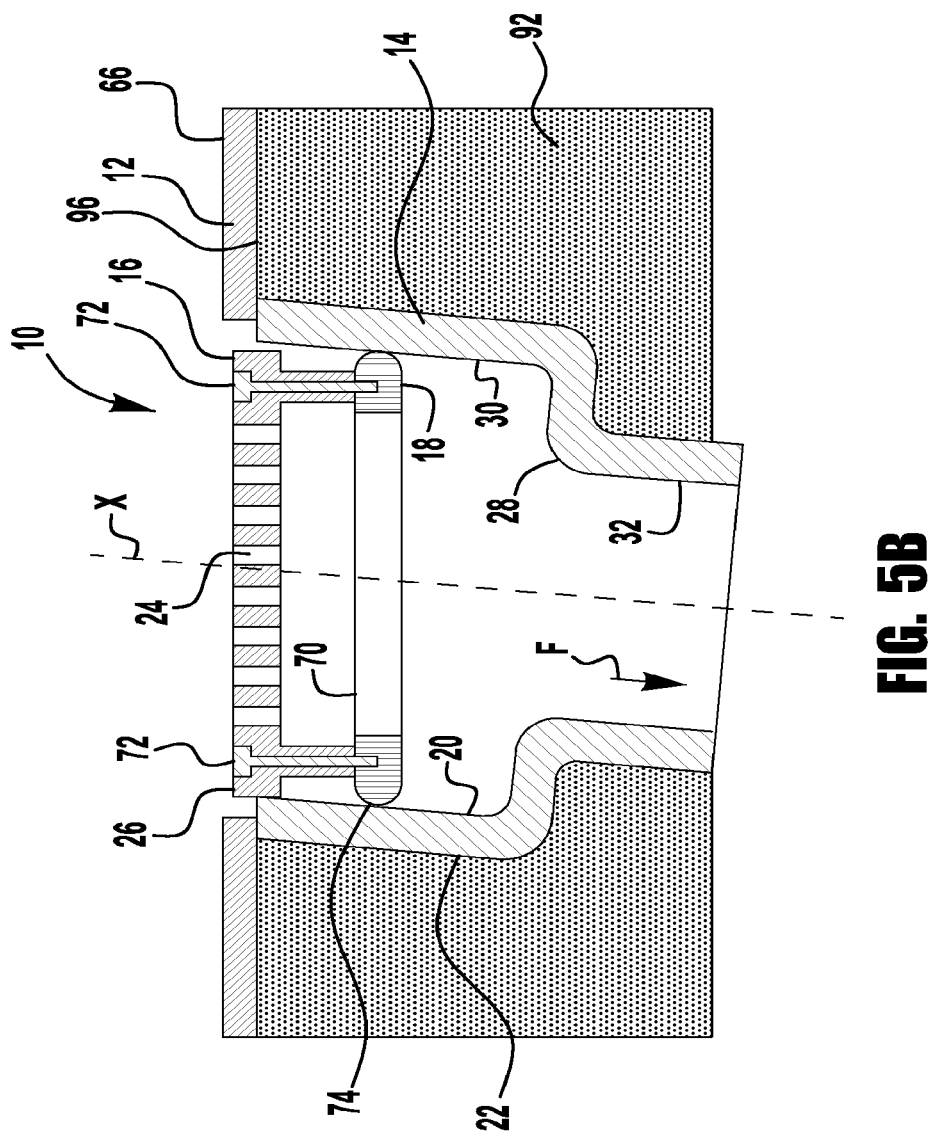

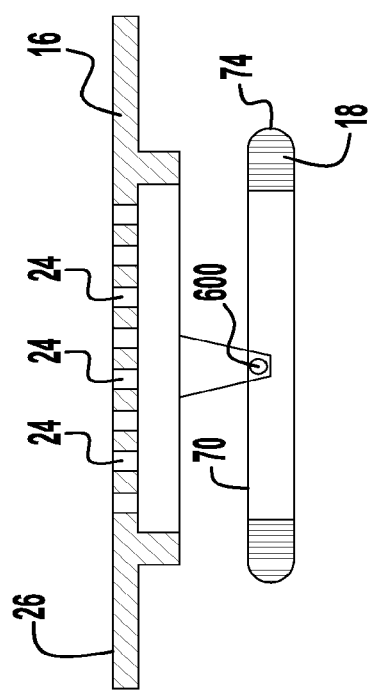

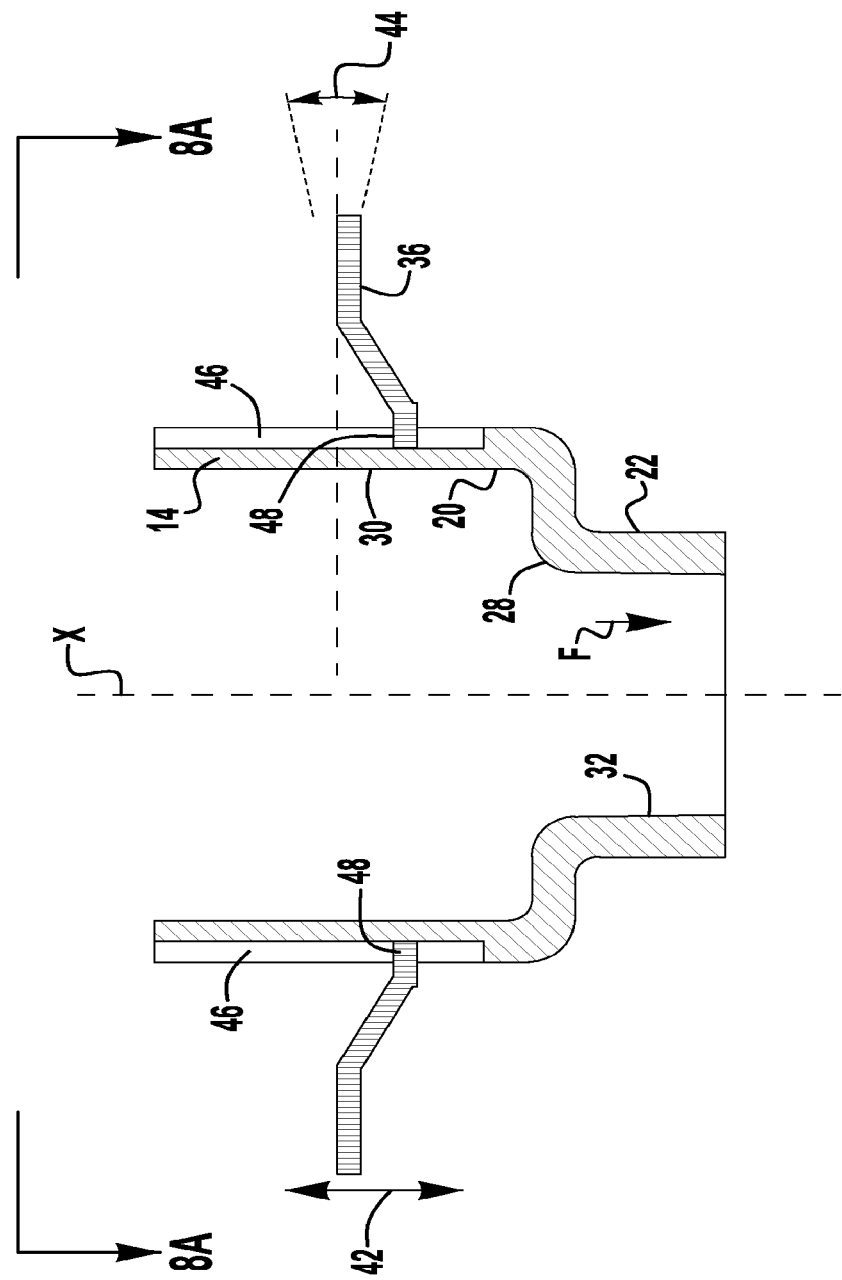

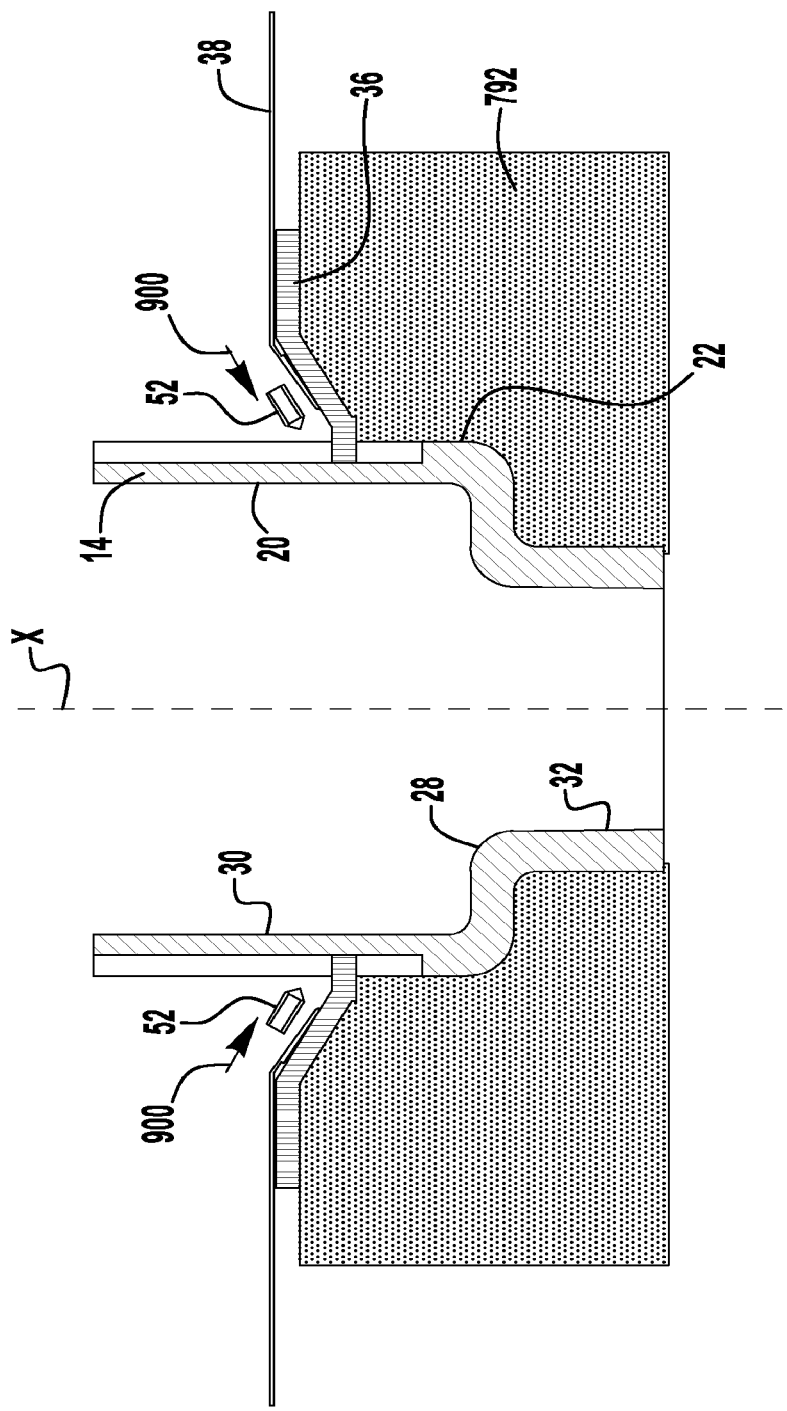

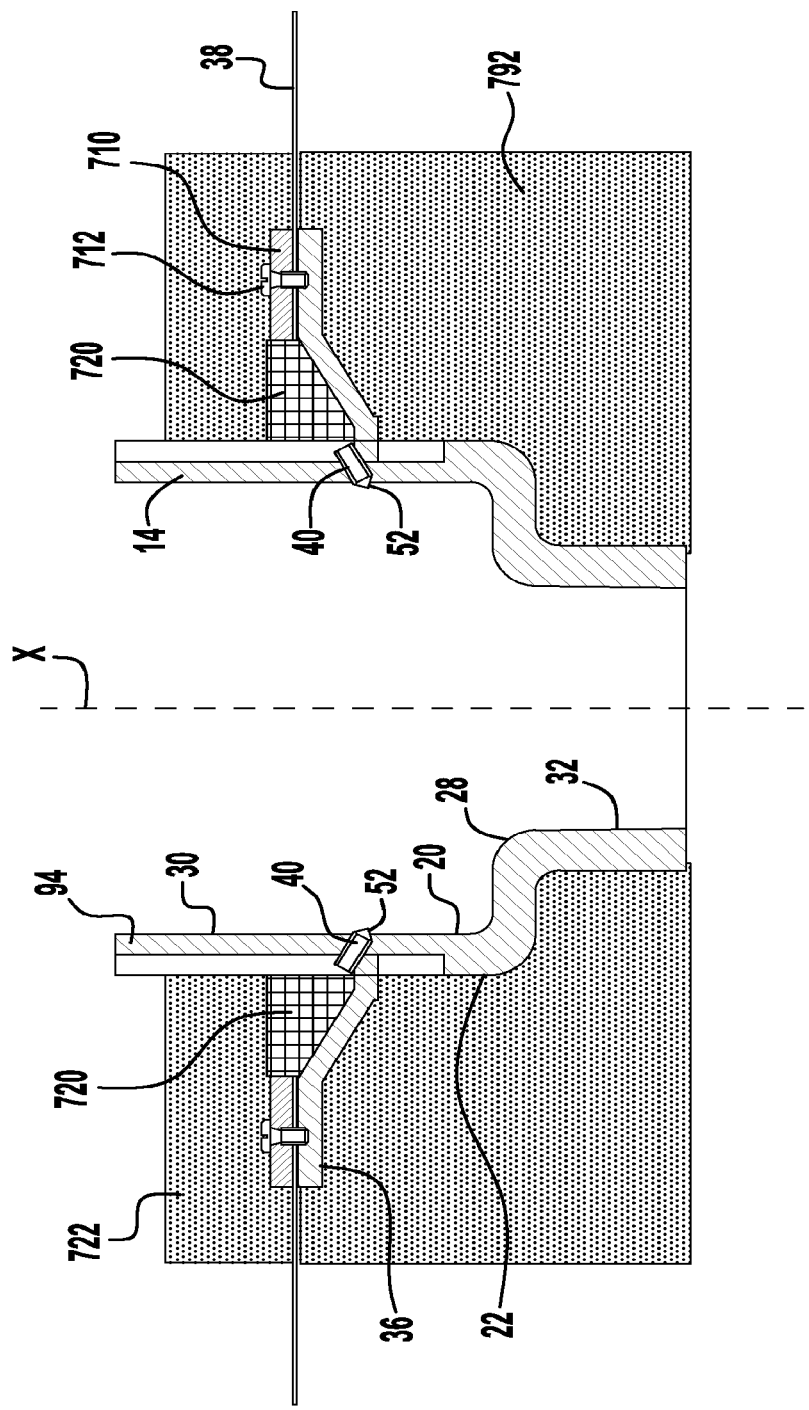

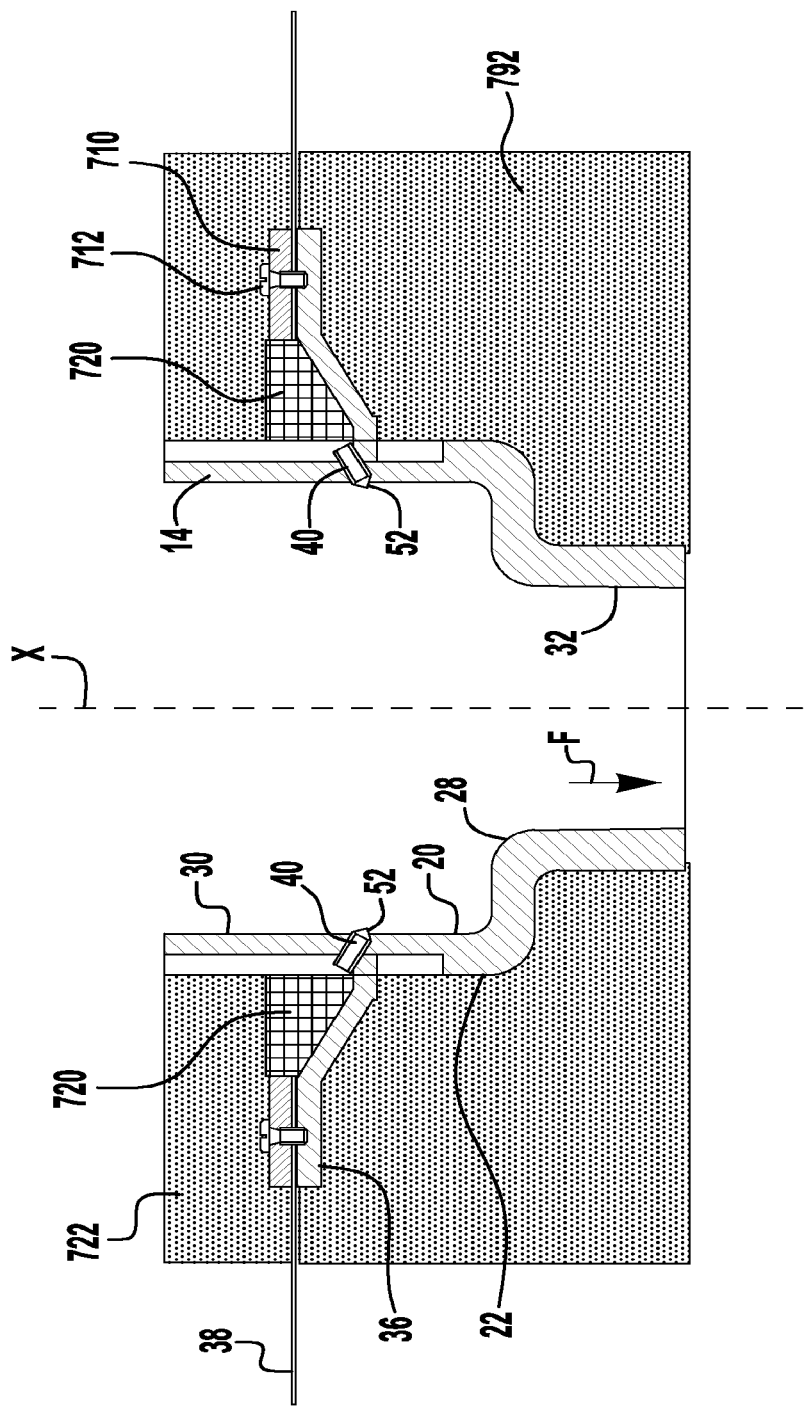

FLOOR DRAIN ASSEMBLY AND METHOD

CROSS REFERENCE TO RELATED APPLICATIONS

This application is a continuation application of U.S. patent application Ser. No. 13/748,180, filed Jan. 23, 2013, and claims the benefit of priority to U.S. Provisional Patent Application No. 61/589,556, filed Jan. 23, 2012, the entireties of which are incorporated herein by reference thereto.

TECHNICAL FIELD

This invention relates to a drain assembly for connecting an area of a floor to a plumbing system for draining effluents.

BACKGROUND

Floor drain assemblies are installed into the floor of a structure at a location where there will be or is the potential for water to be present. Floor drain assemblies connect such flooring area to a waste removal system that is typically a storm or sanitary sewer. Floor drain assemblies are often provided in a substratum, such as concrete that is poured around components of the floor drain assemblies. Floor drain assemblies have many applications, including garage floors, basement floors, building roofs, and shower floors.

SUMMARY

The present application discloses exemplary embodiments of a drain assembly for providing a drain in a floor. The drain assembly includes a drain conduit, a strainer and an adaptor. The drain conduit has an inner surface that defines a fluid flow path and an outer surface. The strainer is disposed above the drain conduit and has openings in fluid communication with the fluid flow path of the drain conduit. The adaptor may be securable in the drain conduit and may be connected to the strainer. Prior to securing the adaptor in the drain conduit, a position of the adaptor in the drain conduit may be moveable to allow a top surface of the strainer to be substantially aligned with the floor. An exemplary embodiment of a method of assembling a drain in a floor is also disclosed.

BRIEF DESCRIPTION OF THE DRAWINGS

The accompanying drawings incorporated herein and forming a part of the specification, illustrate several embodiments of the present invention and together with the description serve to explain certain principles of the invention.

FIG. 1A is a bottom view of an exemplary embodiment of a strainer for use in the drain installation illustrated by FIG. 1;

FIG. 1B is a bottom view of an exemplary embodiment of a strainer for use in the drain installation illustrated by FIG. 1;

FIG. 1C is a top view of an exemplary embodiment of an adaptor for use in the drain installation illustrated by FIG. 1;

FIG. 2A is a schematic sectional view of a exemplary embodiment of a substratum disposed around a drain conduit;

FIG. 2B is a schematic sectional view of an exemplary embodiment of an assembly of a strainer and an adaptor positioned above a drain conduit disposed in a substratum;

FIG. 3C is a schematic sectional view of an exemplary embodiment of a drain installation;

FIG. 5B is a schematic sectional view of an exemplary embodiment of a drain installation;

FIG. 6 is a schematic sectional view of an exemplary embodiment of a strainer and adaptor assembly;

FIG. 8 is a schematic sectional view of an exemplary embodiment of a drain conduit having an adjustable flange;

FIG. 9A is a schematic sectional view of a exemplary embodiment of a first layer of a two layer substratum disposed around a drain conduit having an adjustable flange;

FIG. 9B is a schematic sectional view of a exemplary embodiment of a two layer substratum disposed around a drain conduit having an adjustable flange;

FIG. 9C is a schematic sectional view of a exemplary embodiment of a two layer substratum disposed around a drain conduit having an adjustable flange;

DETAILED DESCRIPTION

Figure 1:
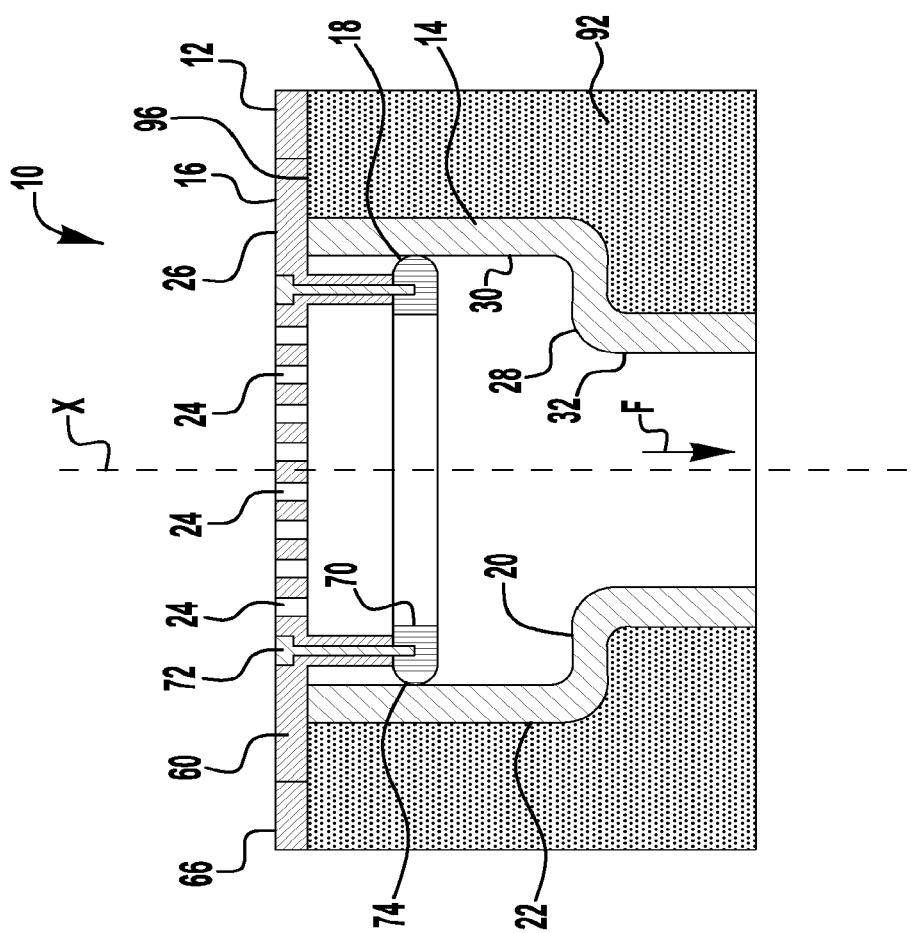
FIG. 1 is a schematic sectional view of an exemplary embodiment of a drain installation.

Prior to discussing the various embodiments, a review of the definitions of some exemplary terms used throughout the disclosure is appropriate. Both singular and plural forms of all terms fall within each meaning:

"Connecting" and "securing" as used herein, includes but is not limited to affixing, joining, attaching, fixing, fastening, placing in contact two or more components, elements, assemblies, portions or parts. Connecting or securing two or more components, etc., can be direct or indirect such as through the use of one or more intermediary components and may be intermittent or continuous.

In the embodiments discussed herein, the drain assembly and method of installing a drain assembly is described for use in a poured concrete floor. However, the drain assembly and method of installing a drain assembly of the present application may be used with a variety of other types of floors and substrates. For example, the drain assembly and method of installing a drain assembly described herein are equally applicable to roof drains, shower drains, and the like.

In accordance with one general embodiment, a drain assembly 10 for providing a drain in a floor 12 includes a drain conduit 14, a strainer 16 or grate, and an adaptor 18. In an exemplary embodiment, the drain conduits 14, adaptors 18 and other drain components may be made from PVC.

The drain conduit 14 has an inner surface 20 that defines a fluid flow path F and an outer surface 22. The strainer 16 is disposed above and/or in the drain conduit 14. The strainer 16 has openings 24 in fluid communication with the fluid flow path F of the drain conduit 14. The adaptor 18 is securable in the drain conduit 14 and connected to the strainer 16. Prior to securing the adaptor 18 in the drain conduit 14, a position of the adaptor in the drain conduit is moveable to allow a top surface 26 of the strainer to be substantially aligned with the floor 12.

The drain conduit 14 can take a wide variety of different forms. For example, the drain conduit 14 may comprise a single piece or multiple pieces. In the examples illustrated by FIGS. 1, 2A-2C, 3A-3C, 4A, 4B, 5A, 5B, 7A, 7B, 8, and 9A-9D, the drain conduit is a single piece. In the example illustrated by FIGS. 12A-22D, the drain conduit 14 comprises several members that are assembled together. The drain conduit may have any form that provides a flow path F and allows installation of the adaptor 18. In an exemplary embodiment, the drain conduit 14 is generally cylindrical. However, the drain conduit 14 can have a wide variety of different shapes. In the illustrated embodiment, the drain conduit 14 includes a step 28 between a large diameter portion 30 and a small diameter portion 32. However, the drain conduit can have any configuration depending on the application. For example, in one exemplary embodiment, the drain conduit 14 is simply a pipe having uniform cylindrical internal diameter and a uniform cylindrical external diameter. In one exemplary embodiment, represented by the dashed line 34 in FIG. 2A, the inner surface 20 is tapered. This taper 34 may be included when the drain conduit 14 is a molded to facilitate removal of the drain conduit from the mold. In embodiments where the inner surface 20 is tapered, the adaptor 18 may be radially adjustable as will described below in more detail.

Figure 7A:
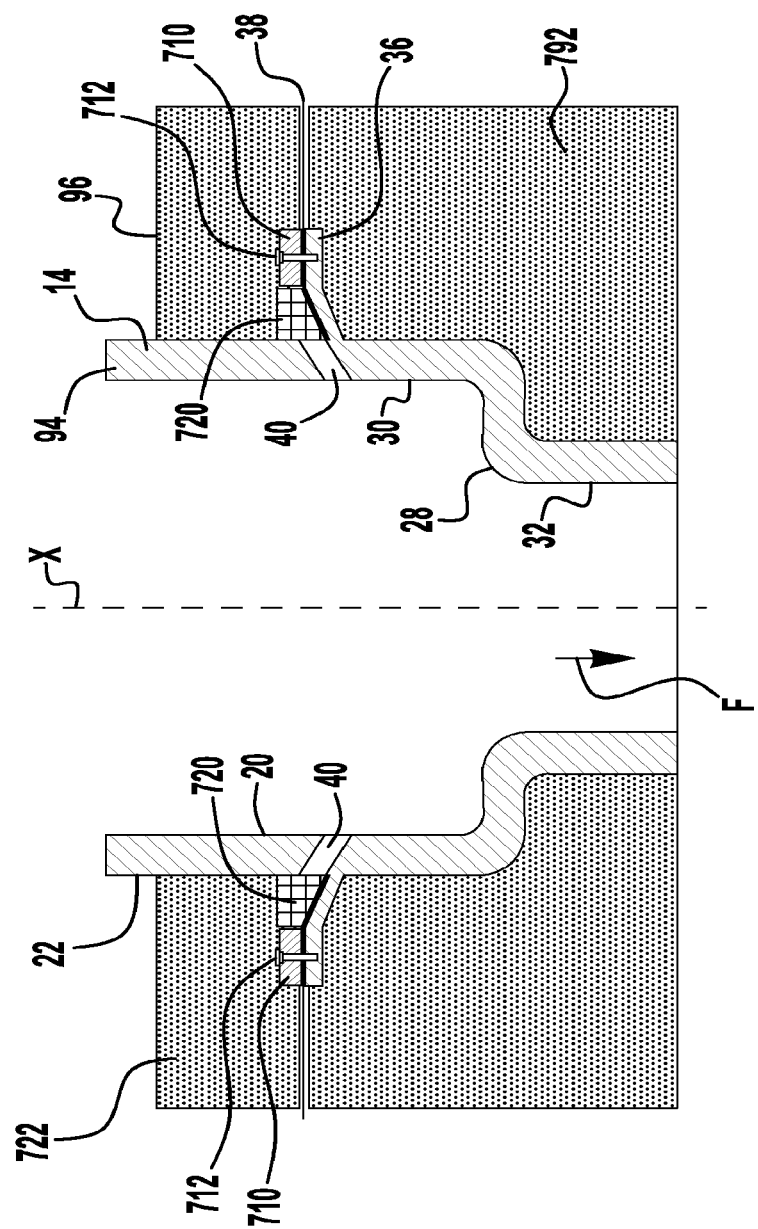
FIG. 7A is a schematic sectional view of a exemplary embodiment of a two layer substratum disposed around a drain conduit having a flange.

Referring to FIG. 7A, in one exemplary embodiment the drain conduit 14 includes a flange 36. The flange 36 may take a wide variety of different forms. In the illustrated embodiment, the flange 36 extends radially outward from the drain conduit 14 to facilitate attachment to the drain conduit. For example, in one exemplary embodiment, the flange 36 is configured for attachment to a membrane 38 that catches effluent, such as water. The illustrated flange 36 is shaped to direct effluent on the membrane 38 through weep holes 40 into the drain conduit 14. The illustrated flange 36 ramps downward toward the weep holes 40 to provide drainage from the membrane.

Figure 8B:
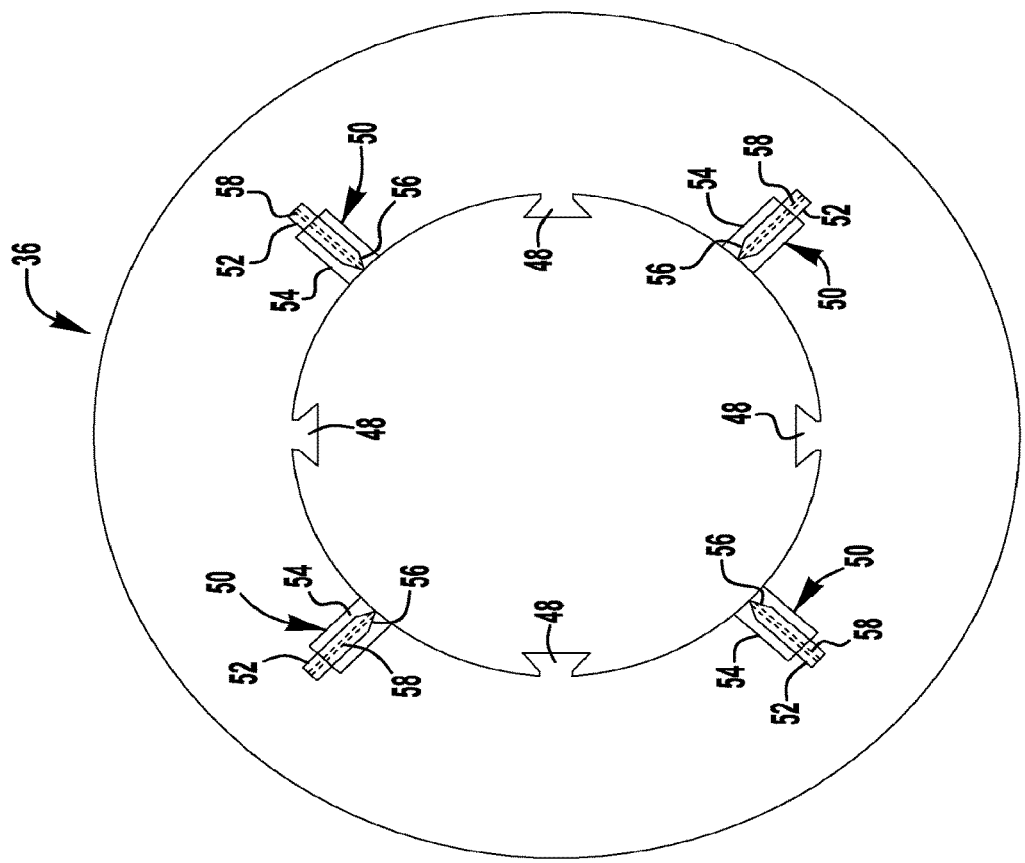
FIG. 8B is a top view of the flange illustrated by FIG. 8.
Figure 8A:
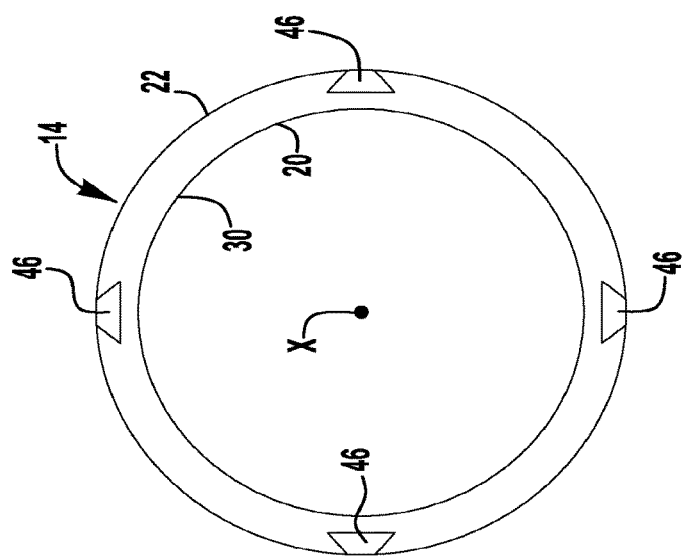
FIG. 8A is a top view of the drain conduit illustrated by FIG. 8.

The flange 36 may be integrally formed with the drain conduit 14 as illustrated by FIG. 7A or the flange 36 may be a separate component that is assembled with the drain conduit 14 as illustrated by FIG. 8. Referring to FIG. 8, in one exemplary embodiment, a separate flange 36 is adjustable along the drain conduit 13 as indicated by arrow 42. The flange 36 and drain conduit 14 may be configured to allow for adjustment in a wide variety of different ways. The flange 36 may be moved along the axis X of the drain conduit 14 as indicated by arrow 42 and/or the flange 36 may be tilted with respect to the drain conduit 14 as indicated by arrow 44. The flange 36 may be coupled to the drain conduit 14 in a wide variety of different ways. For example, the flange 36 may be coupled to the drain conduit by fasteners, projections that mate with recesses, mating threads, fasteners that mate with projections or recesses and the like. In the illustrated embodiment, the drain conduit 14 includes channels 46 and the flange includes projections 48. In other embodiments, the drain conduit has the projections and the flange has the channels or cutouts. The projections 48 fit within the channels 46 to slidably couple the flange 36 to the drain conduit 14. In one exemplary embodiment, the respective sizes and/or shapes of the projections 48 and the channels 46 are selected to control the amount of tilt 44 that is allowed between the flange 36 and the drain conduit 14. For example, the sizes of the projections 48 and the channels 46 may be selected to set the amount of tilt 44 to 0-30 degrees, 0-20 degrees, 0-10 degrees, 0-5 degrees, or about 0 degrees. The amount of tilt 44 can also be controlled in a wide variety of other ways.

Once the flange 36 is moved to the desired position on the drain conduit 14, the position of the flange 36 is set in an exemplary embodiment. The position of the flange 36 can be set in a wide variety of different ways. For example, the position of the flange 36 can be set with fasteners, adhesive, such as PVC adhesives and/or solvents, etc. In one exemplary embodiment, the position of the flange 36 is set with an adhesive, such as PVC adhesives and/or solvents, and a seal is formed between the flange 36 and the drain conduit 14 around the entire perimeter of the drain conduit 14. This seal prevents effluent, such as water, that drains onto the flange from leaking between the flange 36 and the drain conduit 14. For example, the drain conduit 14 and the flange 36 can be made from compatible plastics that can be welded together by adhesives and/or solvents that are compatible with the plastics. For example, the drain conduit 14 and the flange 36 may both be made from polyvinylchloride and may be connected together using PVC adhesives and/or solvents.

Referring to FIGS. 8B, 9A and 9B, weep holes 40 are formed through the drain conduit 14 adjacent to the flange 36 after the position of the flange is selected and/or fixed. The weep holes are formed after the position of the flange is fixed so that effluent that drains onto the flange 36 is directed through the weep holes 40 and into the drain conduit 14. The weep holes 40 can be formed in a wide variety of different ways. For example, the weep holes can be drilled in the drain conduit or hollow fasteners, such as hollow screws, can be applied to penetrate the drain conduit, the drain conduit can be provided with a plurality of weep hole knockouts and the appropriate knockouts are knocked out after the flange is fixed in place. Any manner of providing the weep holes 40 at an appropriate position can be implemented. In one exemplary embodiment illustrated by FIG. 8B, weep hole forming devices 50 are provided on the flange 36. After the position of the flange 36 is set, the weep hole forming devices can be operated to form the weep holes 40 adjacent to the flange. The weep hole forming devices 50 can take a wide variety of different forms. Any arrangement capable of providing a hole in the drain conduit 14 adjacent to the flange 36 for drainage of effluent on the flange into the drain conduit 14 can be used. The illustrated weep hole forming device 50 comprises a hollow cutting member 52 disposed in a holder 54. The hollow cutting member 52 has an outside cutting surface 56 and a passage 58. When the hollow cutting member 52 is pushed and/or turned in the holder into the drain conduit 14, the cutting surface 56 cuts through drain conduit and the passage 58 forms a weep hole into the drain conduit 14.

Referring to FIGS. 1, 1A, and 1B the strainer 16 can take a wide variety of different forms. The strainer 16 can be any conventional strainer or grate or the strainer may be specially configured to be connected to the adaptor 18. The illustrated strainer 16 is a circular disk 61 having a plurality of openings 24. However, the strainer 16 can have a wide variety of different shapes, such as circular, square, etc. In the examples illustrated by FIGS. 1, 1A, and 2B, the circular disk 61 is sized to cover the end of the drain conduit 14. In the examples illustrated by FIGS. 1B, and 4B, the circular disk 61 is sized to substantially match the size of the opening of the drain conduit 14.

In one exemplary embodiment illustrated by FIG. 2B, an optional removable cap 62 may be provided on the strainer 16. The optional removable cap 62 may take a wide variety of different forms. In one exemplary embodiment, the removable cap 62 aids in installation of the strainer 16 and adaptor 18 with the drain conduit 14. For example, the removable cap 62 may be disposed on top of the strainer and extend radially outward of the strainer or include portions 63 that extend radially outward of the strainer. The strainer 16 is placed in an opening 64 in the floor 12 and the strainer cap 62 is placed on the floor to align the top surface 26 of the strainer 16 with a top surface 66 of the floor. Once the adaptor 18 and strainer 16 are secured with respect to the drain conduit 14, the removable cap 62 may be removed from the strainer 16. For example, the removable cap 62 may include one or more snap connector 68 that extend through one or more of the strainer openings 24.

Referring to FIGS. 1, 1C, 10, 11A, 11B, 12 and 19 the adaptor 18 may take a wide variety of different forms. The adaptor 18 may be any arrangement capable of attaching the strainer 16 to the drain conduit 14 and allows effluent, such as water to pass through the drain conduit 14. In the example illustrated by FIGS. 1 and 1C, the adaptor 18 is a circular ring 70 that is attachable to the strainer 16, for example by fasteners 72. An outer surface 74 of the circular ring 70 is sized to closely fit the inner surface 20 of the drain conduit 14. The outer surface 74 can take a wide variety of different forms. For example, the outer surface 74 can be generally cylindrical or the outer surface 74 can be rounded as illustrated by FIG. 1 to make tilting of the adaptor 18 inside the drain conduit 14 easier.

In one exemplary embodiment, the circular ring 70 is adapted to fit drain conduits having different internal diameters and/or drain conduits having a tapered inner surface 20 and thus a varying internal diameter along the drain conduit. This can be accomplished in a wide variety of different ways. For example, the circular ring 70 can be configured to be radially expanded and/or radially compressed. A circular ring 70 can be made to be radially compressible in a variety of different ways. For example, in FIG. 1C dashed lines 76 represent a cut in the circular ring 70. When the ring 70 is used in a space that is smaller than the normal outside diameter of the circular ring, the circular ring 70 is pressed radially inward and ends 78 of the ring 70 move closer to one another. In the exemplary embodiment illustrated by FIG. 10, the outer periphery of the circular ring 70 includes a plurality of notches 80 and corresponding legs 82. When the ring 70 is used in a space that is smaller than the normal outside diameter of the circular ring, the legs 82 are flexed inward to allow the ring to fit in the space.

Figure 11B:
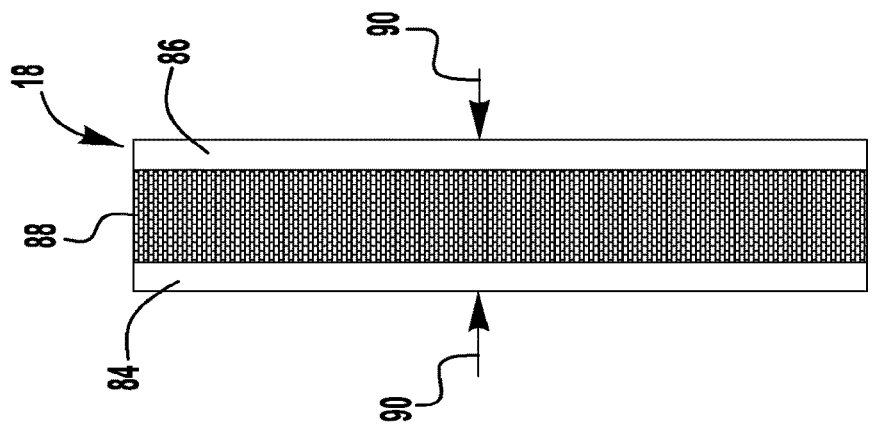
FIG. 11B is a side view of the adaptor shown in FIG. 11A.
Figure 11A:
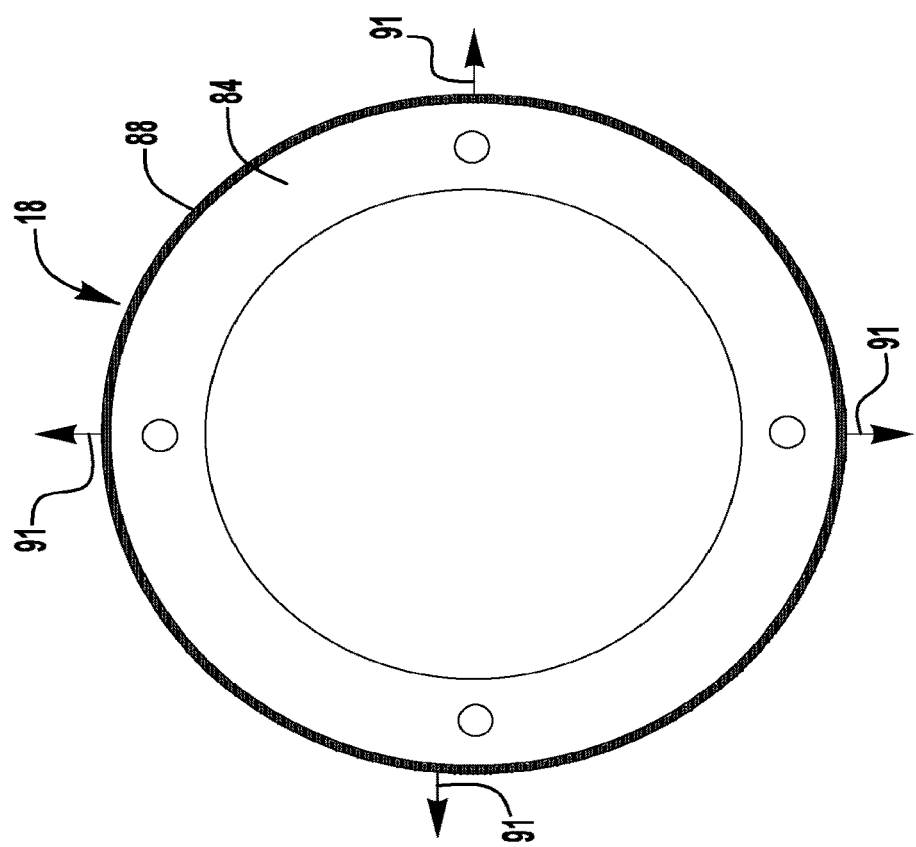
FIG. 11A is a top view of an exemplary embodiment of an adaptor for use in a drain installation.

FIGS. 11A and 11B illustrate another embodiment of an adaptor 20. In the example illustrated by FIGS. 11A and 11B, the adaptor 20 includes a first clamp member 84, a second clamp member 86, an engagement member 88, and a coupling arrangement (indicated schematically by arrows 90). The coupling arrangement 90 couples the first clamp member 84 to the second clamp member 86 such that the coupling arrangement 90 can move the first clamp member 86 toward the second clamp member 88. When the first clamp member 84 moves relatively toward the second clamp member 86, the clamp members force the engagement member 88 radially outward as indicated by arrows 91. This radially outward movement may be caused by squeezing of the engagement member and/or the clamp members 84, 86 may have tapered surface(s) (not shown) that force the engagement member 88 radially outward. The engagement member 88 moves into contact with the inner surface 22 of the drain conduit 14 to secure the adaptor to the drain conduit. The coupling arrangement 90 can take a wide variety of different forms. Examples of suitable coupling arrangements 90 include, but are not limited to, threaded couplings, threaded fasteners, cam and follower couplings, and the like. The engagement member 88 can take a wide variety of different forms. In one exemplary embodiment, the engagement member 90 is a ring of resilient material, such as a rubber ring or a ring made of a material having rubber-like properties.

Figure 2C:
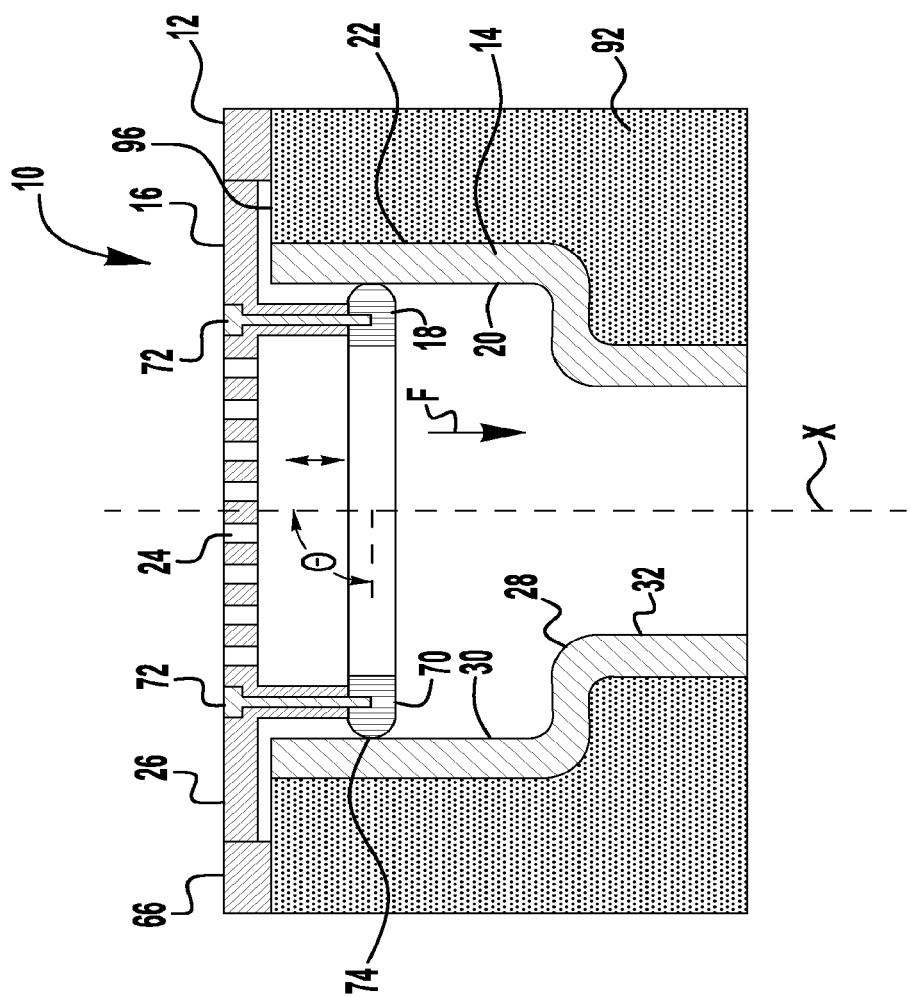
FIG. 2C is a schematic sectional view of an exemplary embodiment of a drain installation.

FIGS. 2A-2C illustrate an exemplary embodiment of a method of installing a drain assembly 10 in a floor 12. Referring to FIG. 2A, a substratum 92 is provided around the drain conduit 14. For example, cement or concrete may be poured around the drain conduit 14. Referring to FIG. 2B, a top end 94 of the drain conduit 14 is cut off. For example, the drain conduit 14 may be cut so that the cut end is flush with the top surface 96 of the substratum, so that the cut end will be flush with the top surface 66 of the floor 12, or so that the height of the cut end that extends above a top surface 96 of the substratum plus the thickness of the strainer is equal to the thickness of the floor. However, any other cut height may be used when installing the floor substrate above the concrete such that an opening in the floor substrate provides access to the inner surface of the drain conduit.

Referring to FIG. 2B, once the drain conduit 14 is cut to the desired height, the floor 12 is installed with an opening 64 in the floor disposed around the drain conduit 14. In some applications, it may be possible to install the floor prior to cutting the drain conduit 14. Further, in some applications, such as in garages and basements, the top surface of the cement or concrete substratum 92 is the top surface of the floor.

In the exemplary embodiment illustrated by FIG. 2B, the strainer 16 and the adaptor 18 are assembled prior to being installed in the drain conduit 14. The strainer 16 and the adaptor 18 may be assembled in a wide variety of different ways. For example, the strainer 16 and the adaptor 18 may be assembled with fasteners, with adhesives, may be provided with mating structures, or the strainer 16 and the adaptor 18 may be integrally formed. In the exemplary embodiment illustrated by FIG. 2B, the strainer 16 and the adaptor 18 are assembled with fasteners 72. The illustrated fasteners 72 are installed from the top of the strainer 16 to allow removal of the strainer after installation.

Referring to FIG. 2C, once the strainer 16 and the adaptor 18 are assembled, the adaptor is inserted into the drain conduit 14. In another embodiment, the adaptor is installed in the drain conduit before the strainer is attached to the adaptor. In an exemplary embodiment, the adaptor 18 is slidably disposed and is optionally tiltable in the drain conduit 14 prior to being secured in the drain conduit The position of the adaptor 18 in the drain conduit 14 is adjusted to substantially align the strainer 16 with a top surface 66 of the floor. In an exemplary embodiment, the position of the adaptor 18 along the axis X of the drain conduit is adjustable and an angle θ of the adaptor with respect to the axis X of the drain conduit is adjustable. Once the strainer 16 is aligned with the floor 12 the position of the adaptor 18 inside the drain conduit 14 is fixed to set the position of the strainer 16 in substantial alignment with the top surface 66 of the floor.

The position of the adaptor 18 may be fixed in a wide variety of different ways. For example, the adaptor 18 may be fixed with fasteners and/or adhesive, such as PVC adhesives and/or solvents, and/or the adaptor may include structure for fixing the position of the adaptor in the drain conduit 14. In one exemplary embodiment, the adaptor 18 and the drain conduit 14 are made from plastics that can be welded together by adhesives and/or solvents that are compatible with the plastics. For example, the drain conduit 14 and the adaptor 18 may both be made from polyvinylchloride and may be connected together using PVC adhesives and/or solvents. In another exemplary embodiment, the adaptor 18 includes an expandable portion 88 that expands radially outward into contact with the inner surface 20 of the drain conduit 14 to secure the adaptor to the drain conduit (See the adaptor illustrated by FIGS. 11A and 11B).

Figure 3A:
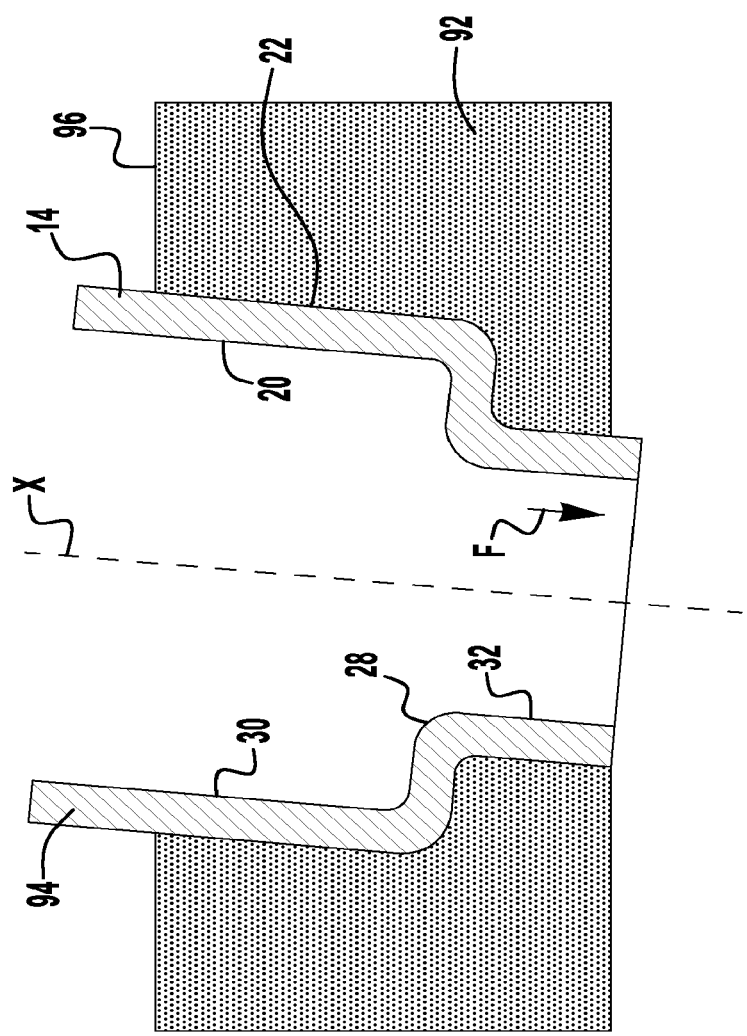
FIG. 3A is a schematic sectional view of a exemplary embodiment of a substratum disposed around a drain conduit.
Figure 3B:
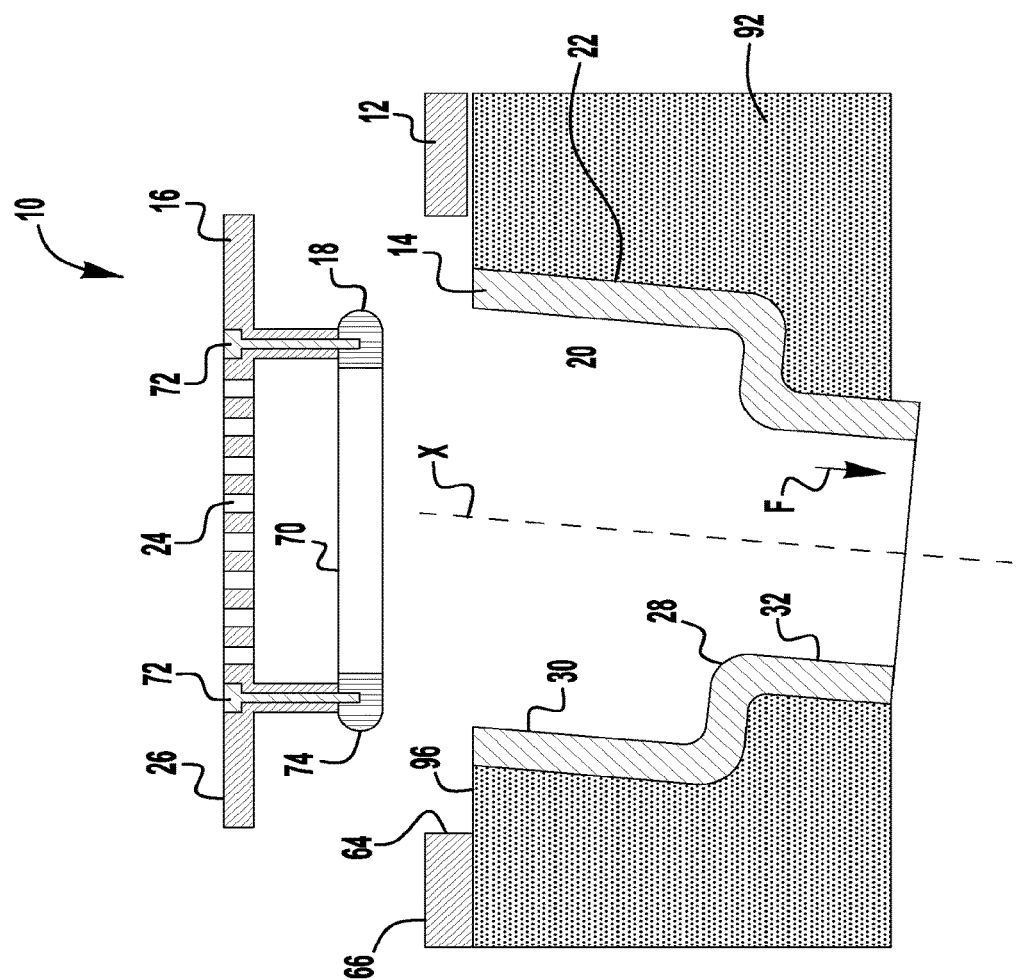
FIG. 3B is a schematic sectional view of an exemplary embodiment of an assembly of a strainer and an adaptor positioned above a drain conduit disposed in a substratum.

FIGS. 3A-3C illustrate an exemplary embodiment of a method of installing a drain assembly 10 in a floor 12, except the drain conduit 14 is tilted in the floor. When cement 92 is poured around the drain conduit 14, the heavy cement may cause the drain conduit 14 to tilt from a vertical position. Referring to FIG. 3B, a top end 94 of the drain conduit 14 is cut off so that the cut end is parallel with the top surface 96 of the substratum, even though the drain conduit 14 is tilted. As in the FIG. 2 example, top end 94 may be cut such that the cut end is flush with the top of the substratum, so that the cut end will be flush with the top surface 66 of the floor 12, or so that the height of the cut end that extends above the top surface 96 of the concrete plus the thickness of the strainer is equal to the thickness of the floor.

Referring to FIG. 3B, the adaptor 18 is inserted into the drain conduit 14. In the FIG. 3B example, the adaptor 18 is both slidable and tiltable in the drain conduit 14 to allow the strainer to be substantially aligned with a top surface 66 of the floor. Once the strainer 16 is tilted and slid into alignment with the floor 12 the position of the adaptor 18 inside the drain conduit 14 is fixed to set the position of the strainer 16 in substantial alignment with the top surface 66 of the floor. The position of the adaptor 18 may be adjusted and fixed as described with respect to FIG. 2B.

Figure 4A:
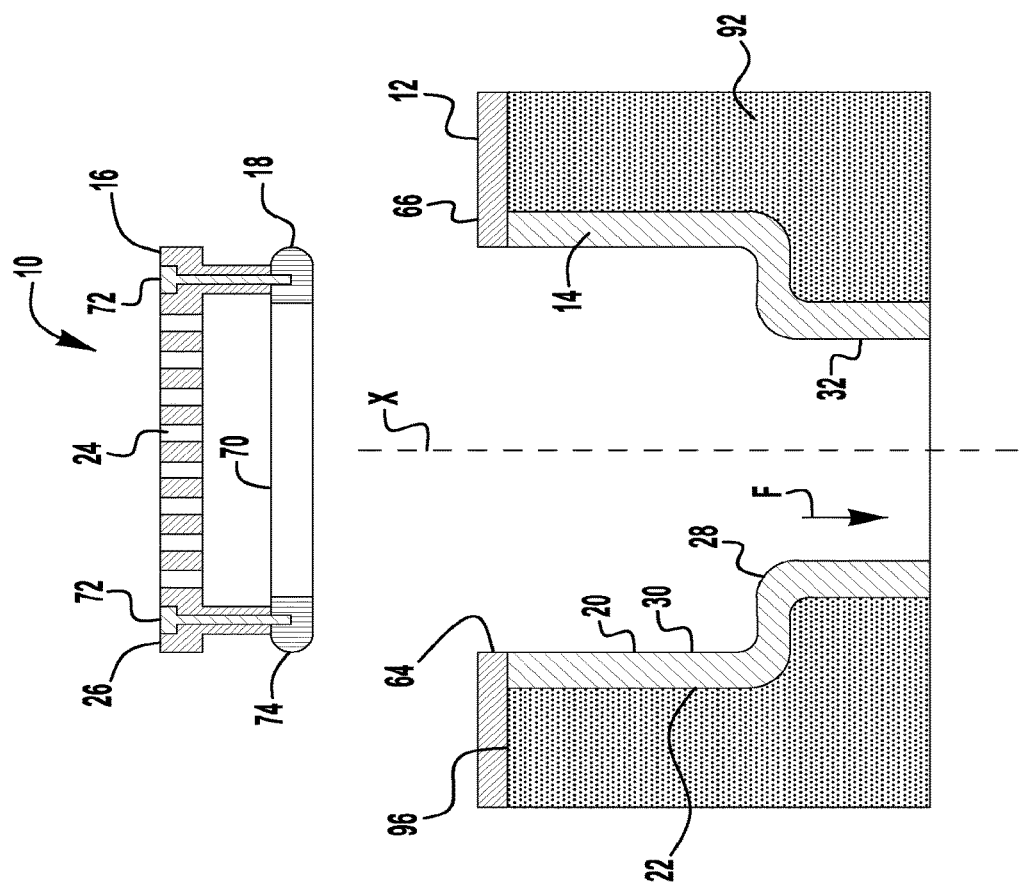
FIG. 4A is a schematic sectional view of an exemplary embodiment of an assembly of a strainer and an adaptor positioned above a drain conduit disposed in a substratum.
Figure 4B:
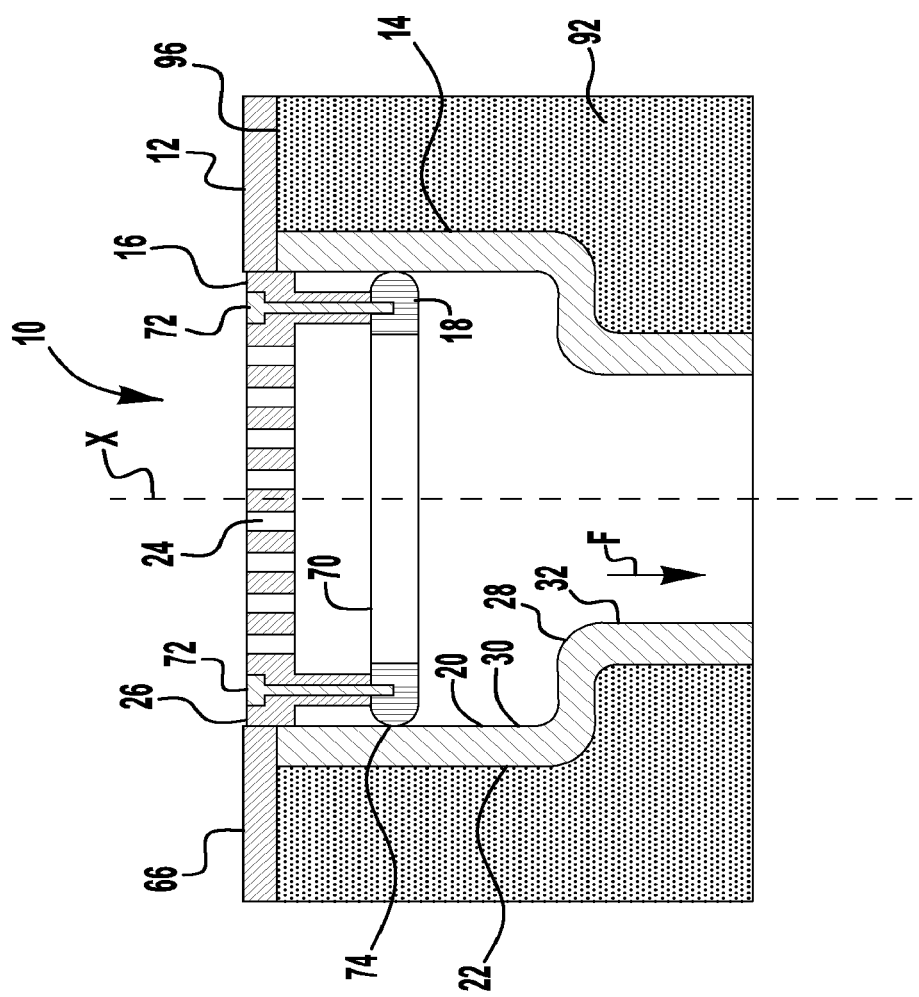
FIG. 4B is a schematic sectional view of an exemplary embodiment of a drain installation.
Figure 5A:
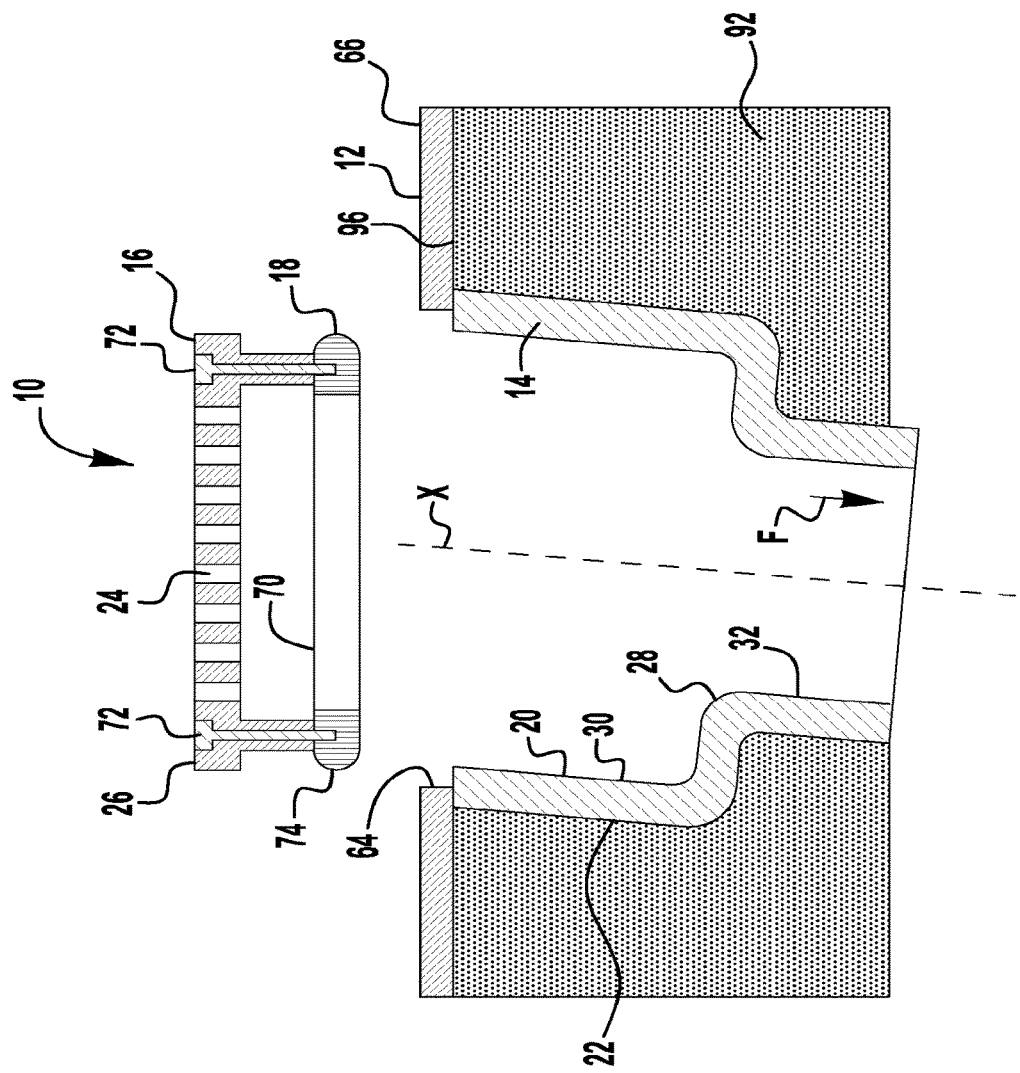
FIG. 5A is a schematic sectional view of an exemplary embodiment of an assembly of a strainer and an adaptor positioned above a drain conduit disposed in a substratum.

FIGS. 4A-4C illustrate another exemplary embodiment that is similar to the embodiment illustrated by FIGS. 2A-2C and FIGS. 5A-5C illustrate another exemplary embodiment that is similar to the embodiment illustrated by FIGS. 3A-3C, except the strainer 16 has a smaller diameter. In the examples illustrated by FIGS. 4A-4C and 5A-5C, the strainer 16 has a diameter that is the same as or slightly smaller that the diameter of the inner surface 20. This allows the strainer 16 to be positioned inside or partially inside the drain conduit 14, which allows the strainer to be flush with or slightly recessed with respect to a thin a floor substratum 12 or a concrete floor (i.e. no floor substratum 12 is disposed on the concrete).

FIG. 6 illustrates an exemplary embodiment of an assembly of a strainer 16 and an adaptor 18. In the example illustrated by FIG. 6, the strainer 16 and the adaptor 18 are connected by a pivotal connection 600. The pivotal connection 600 illustrated by FIG. 6 can be used with a wide variety of strainers, adaptors, and/or drain conduits, including but not limited to, the strainers 16, adaptors 18, and/or drain conduits 14 disclosed by this application. The pivotal connection 600 facilitates adjustment of an angle of the strainer with respect to the adaptor.

Figure 6A:
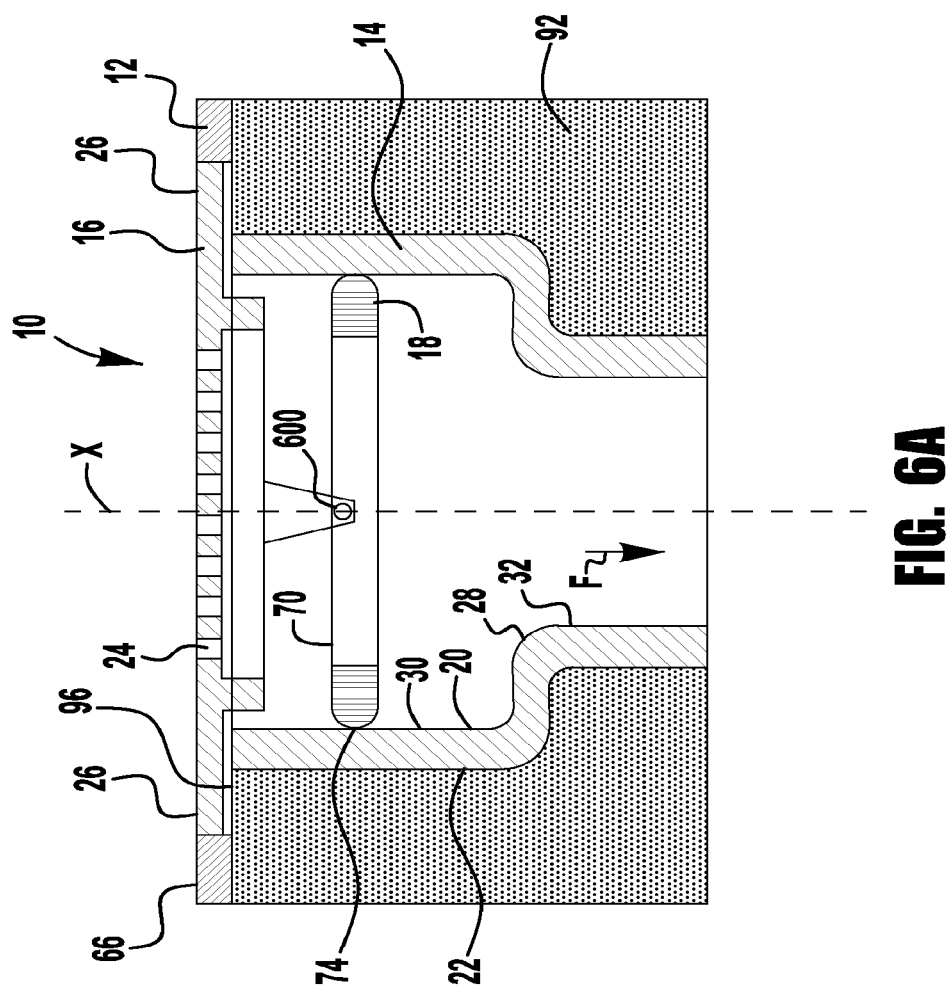
FIG. 6A is a schematic sectional view of an exemplary embodiment of a drain installation.
Figure 6B:
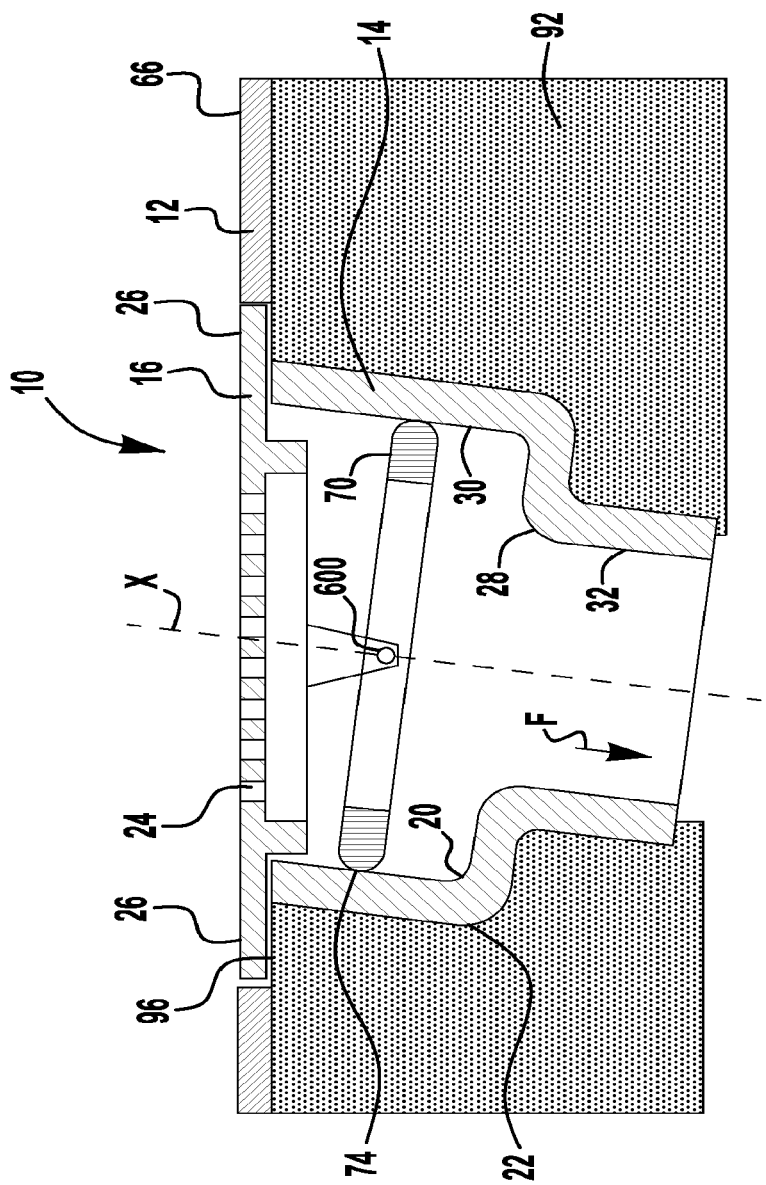
FIG. 6B is a schematic sectional view of an exemplary embodiment of a drain installation.

FIGS. 6A and 6B illustrate drain installations that include the strainer 16, adaptor 18, and pivotal connection 600 illustrated by FIG. 6. In FIG. 6A, the drain conduit 14 is in a vertical orientation and in FIG. 6B, the drain conduit 14 is tilted. During installation, the adaptor 18 is inserted into the drain conduit 14. The adaptor 18 is slidable in the drain conduit 14, rotatable in the drain conduit, and pivotable with respect to the strainer 16. This allows the strainer 16 to be substantially aligned with a top surface 66 of the floor without tilting the adaptor 18 in the drain conduit 14. In an exemplary embodiment, once the position of the strainer 16 with respect to the adaptor 18 that allows alignment of the strainer 16 with the floor 12 is determined, the relative position of the strainer 16 with respect to the adaptor 18 may be fixed. This may be accomplished in a wide variety of different ways. For example, the connection 600 may be secured in place with an adhesive, with fasteners, and/or engagement of the strainer 16 with the drain conduit 14, the floor 12, and/or the substratum 92. The adaptor 18 is secured inside the drain conduit 14 to fix the position of the strainer 16 in substantial alignment with the top surface 66 of the floor.

Figure 7B:
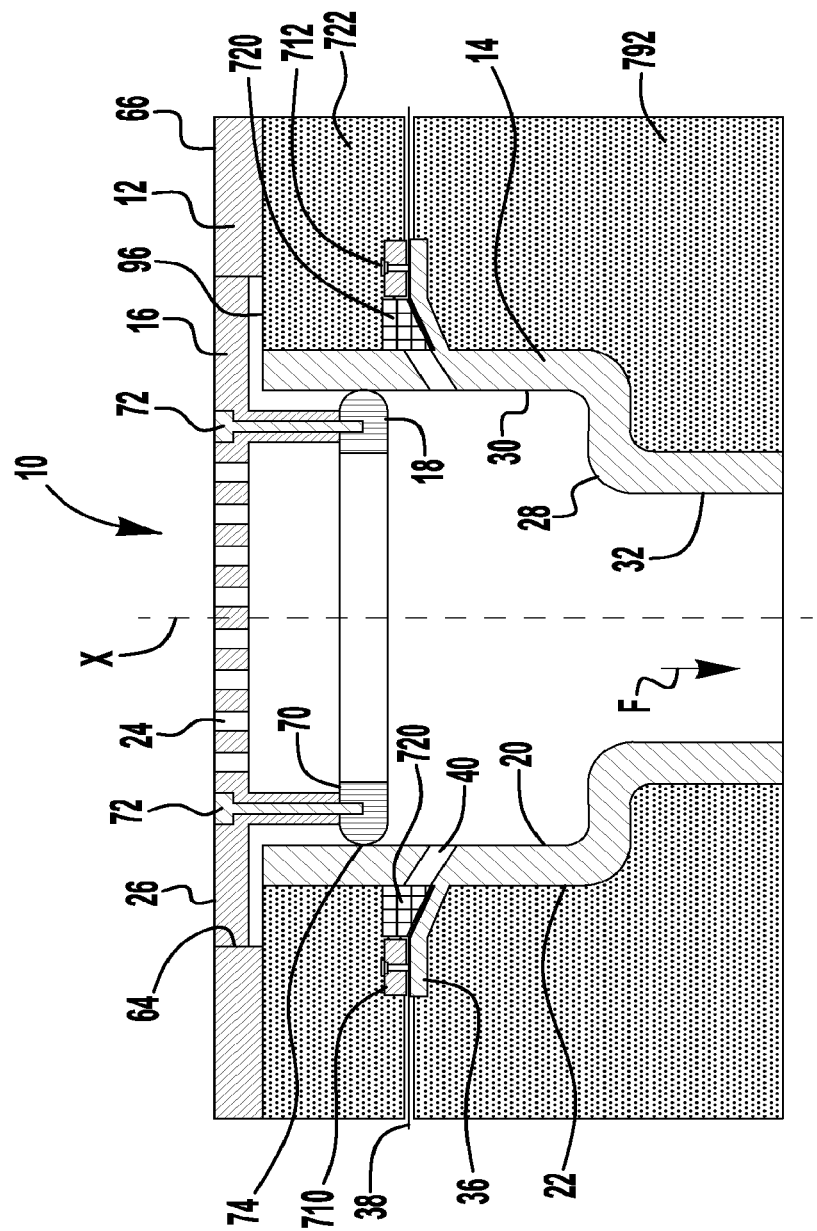
FIG. 7B is a schematic sectional view of an exemplary embodiment of a drain installation.

FIGS. 7A and 7B illustrate an exemplary embodiment of a drain installation where the drain conduit 14 includes a flange 36. The drain conduit 14 is illustrated in a substantially vertical position. However, the drain conduit 14 may be tilted. Referring to FIG. 7A, a first substratum 792, such as concrete is provided around a lower end of the drain conduit 14, below the flange 36. Next, the membrane 38 is placed on top of the substratum 792 and is fastened to the flange 36. The membrane 38 may take a wide variety of different forms. In one exemplary embodiment, the membrane is a sheet of material, such as rubber or plastic, that is impermeable by an effluent, such as water. The membrane 38 may be fastened to the flange 36 in a wide variety of different ways. For example, the membrane 38 may be attached to the flange 36 with fasteners, adhesive, and/or and clamping arrangement. In the illustrated embodiment, the membrane 38 is clamped to the flange 36 with a clamp ring 710. Fasteners 712 may be used to connect the clamp ring 710 to the flange 36. The clamp ring 710 may include passages (not shown) or may be otherwise be configured to allow effluent, such as water, to pass the clamp ring 710 and pass into the weep holes 40. The membrane 38 and the outer portion of the flange 36 are illustrated as substantially lying along a horizontal plane. In some embodiments, the membrane 38 and/or the outer portion of the flange 36 may slope downward toward the weep holes 40.

In an exemplary embodiment, a porous material 720 is provided over or adjacent to the weep holes 40. The porous material 720 may take a wide variety of different forms. Any material capable of preventing a second poured substratum layer 722 from blocking the weep holes, while allowing effluent, such as water, to pass to the weep holes 40 can be used. For example, the porous material may be gravel, such as pea gravel.

After the membrane 38 and the porous material 72 are installed, a second substratum 722, such as mortar, cement, or concrete is provided around an upper end of the drain conduit 14, above the flange 36. For example, mortar, cement or concrete may be poured around the upper end of the drain conduit 14 on top of the flange 36, the membrane 38, and the porous material 72. Referring to FIG. 7B, a top end 94 of the drain conduit 14 is cut off. For example, the drain conduit 14 may be cut so that the cut end is flush with the top surface 96 of the substratum, so that the cut end will be flush with the top surface 66 of the floor 12, or so that the height of the cut end that extends above the top surface 96 of the concrete plus the thickness of the strainer is equal to the thickness of the floor. However, any other cut height may be used installing the floor substrate above the concrete such that an opening in the floor substrate provides access to the inner surface of the drain conduit.

Referring to FIG. 7B, once the drain conduit 14 is cut to the desired height, the floor 12 is installed with an opening 64 in the floor disposed around the drain conduit 14. The strainer 16 and the adaptor 18 are assembled prior to being installed in the drain conduit 14. Once the strainer 16 and the adaptor 18 are assembled, the adaptor is inserted into the drain conduit 14. The position of the adaptor 18 and/or the strainer 16 is adjusted with respect to the drain conduit 14 is to substantially align the strainer 16 with a top surface 66 of the floor as described above. Once the strainer 16 is aligned with the floor 12, the position of the adaptor 18 inside the drain conduit 14 is fixed to set the position of the strainer 16 in substantial alignment with the top surface 66 of the floor.

FIGS. 9A and 9B illustrate an exemplary embodiment of a drain installation that is similar to the embodiment illustrated by FIGS. 7A and 7B, except the position of the flange 36 on the drain conduit 14 is adjustable. The drain conduit 14 is illustrated in a substantially vertical position in the illustration. However, the drain conduit 14 may be tilted. Referring to FIG. 8, a position of the flange 36 for the drain installation may be selected by adjusting the flange in the direction indicated by arrow 42 and/or by tilting the flange as indicated by arrow 44. Once the flange 36 is in the desired position, the position of the flange is set. In one exemplary embodiment, the position of the flange 36 is set with an adhesive and a seal is formed between the flange 36 and the drain conduit 14 around the entire perimeter of the drain conduit 14. This seal prevents effluent, such as water, that drains onto the flange from leaking between the flange 36 and the drain conduit 14. For example, the drain conduit 14 and the flange 36 can be made from compatible plastics that can be welded together by adhesives and/or solvents that are compatible with the plastics. For example, the drain conduit 14 and the flange 36 may both be made from polyvinylchloride and may be connected together using PVC adhesives and/or solvents Once the flange 36 is at the desired position (or the desired position is determined), the weep holes 40 are provided through the drain conduit 14 adjacent to the flange 36. As described above, the weep holes can be formed in a wide variety of different ways. In the example illustrated by FIGS. 9A and 9B, the weep holes are provided by hollow cutting members 52. Referring to FIG. 9A, the hollow cutting members 52 cut through the drain conduit 14 as indicated by arrow 900 to provide weep holes 40. Any number of weep holes can be provided. In the example illustrated by FIG. 9A, the flange 36 is positioned and the weep holes are provided in the drain conduit 14 prior to pouring the first substratum 792. However, in other embodiments, the flange positioning and/or the weep hole forming steps may occur after pouring of the first substratum 792.

Referring to FIG. 9A, the first substratum 792, such as concrete is provided around a lower end of the drain conduit 14, below the flange 36. Next, the membrane 38 is placed on top of the substratum 792 and is fastened to the flange 36 See FIGS. 9A and 9B). In the illustrated embodiment, the membrane 38 is clamped to the flange 36 with a clamp ring 710. Fasteners 712 may be used to connect the clamp ring 710 to the flange 36. The clamp ring 710 may include passages (not shown) or may be otherwise be configured to allow effluent, such as water, to pass the clamp ring 710 and pass into the weep holes 40. The membrane 38 and the outer portion of the flange 36 are illustrated as substantially lying along a horizontal plane. In some embodiments, the membrane 38 and/or the outer portion of the flange 36 may slope downward toward the weep holes 40.

In an exemplary embodiment, a porous material 720 is provided over or adjacent to the weep holes 40. Referring to FIG. 9B, after the membrane 38 and the porous material 72 are installed, a second substratum 722, such as mortar, cement, or concrete is provided around an upper end of the drain conduit 14, above the flange 36. For example, mortar, cement or concrete may be poured around the upper end of the drain conduit drain conduit 14 on top of the flange 36, the membrane 38, and the porous material 72.

Referring to FIGS. 9B and 9C, a top end 94 of the drain conduit 14 is cut off. For example, the drain conduit 14 may be cut so that the cut end is flush with the top surface 96 of the substratum, so that the cut end will be flush with the top surface 66 of the floor 12, or so that the height of the cut end that extends above the top surface 96 of the concrete plus the thickness of the strainer is equal to the thickness of the floor. However, any other cut height may be used installing the floor substrate above the concrete such that an opening in the floor substrate provides access to the inner surface of the drain conduit.

Figure 9D:
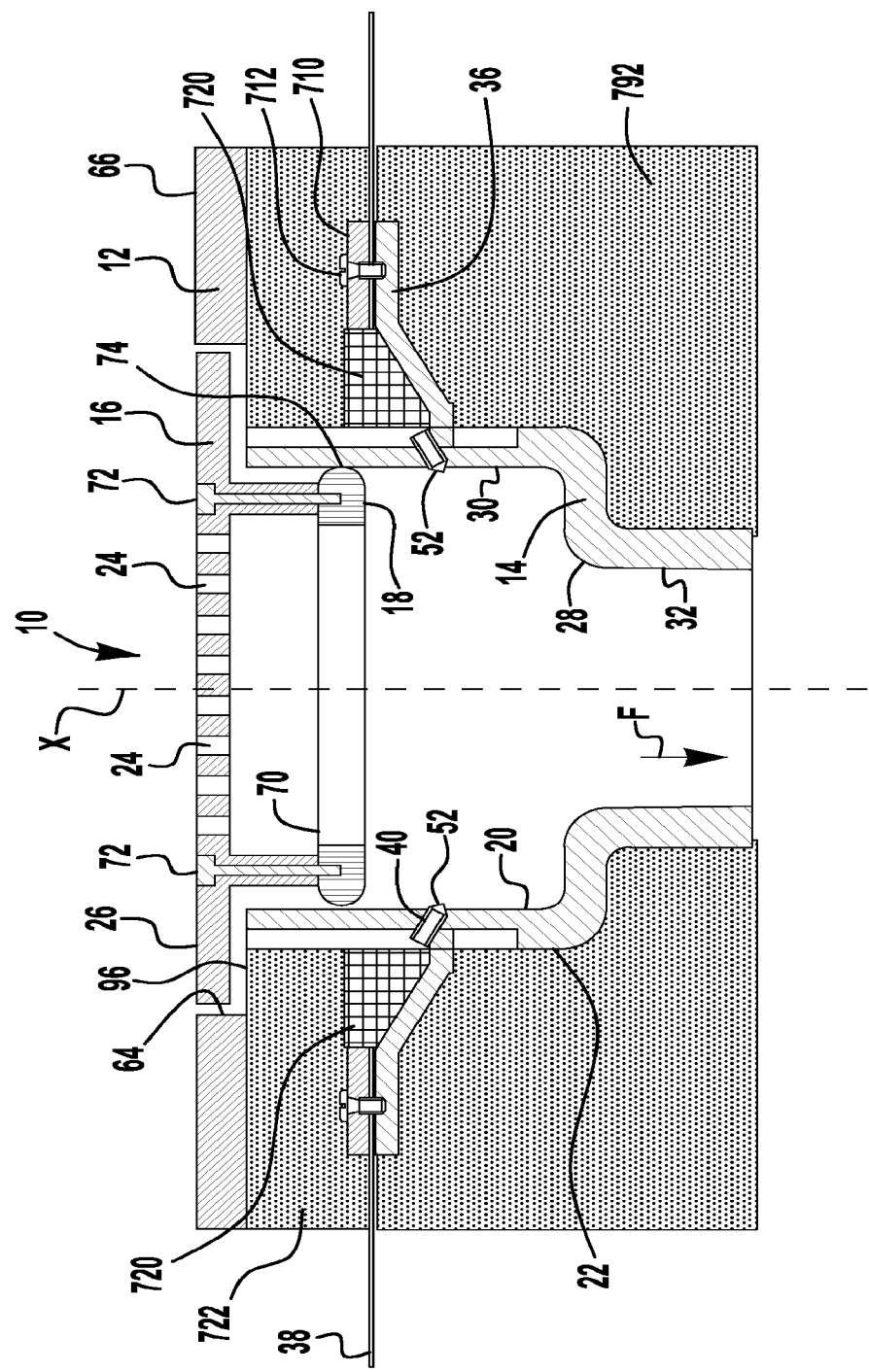
FIG. 9D is a schematic sectional view of an exemplary embodiment of a drain installation.

Referring to FIG. 9D, once the drain conduit 14 is cut to the desired height, the floor 12 is installed with an opening 64 in the floor disposed around the drain conduit 14. In some applications, such as in garages and basements, the top surface of the cement or concrete 92 is the top surface of the floor. In the exemplary embodiment illustrated by FIG. 9D, the strainer 16 and the adaptor 18 are assembled prior to being installed in the drain conduit 14. Once the strainer 16 and the adaptor 18 are assembled, the adaptor is inserted into the drain conduit 14. The position of the adaptor 18 and/or the strainer 16 is adjusted with respect to the drain conduit 14 is to substantially align the strainer 16 with a top surface 66 of the floor as described above. Once the strainer 16 is aligned with the floor 12, the position of the adaptor 18 inside the drain conduit 14 is fixed to set the position of the strainer 16 in substantial alignment with the top surface 66 of the floor.

Figure 10:
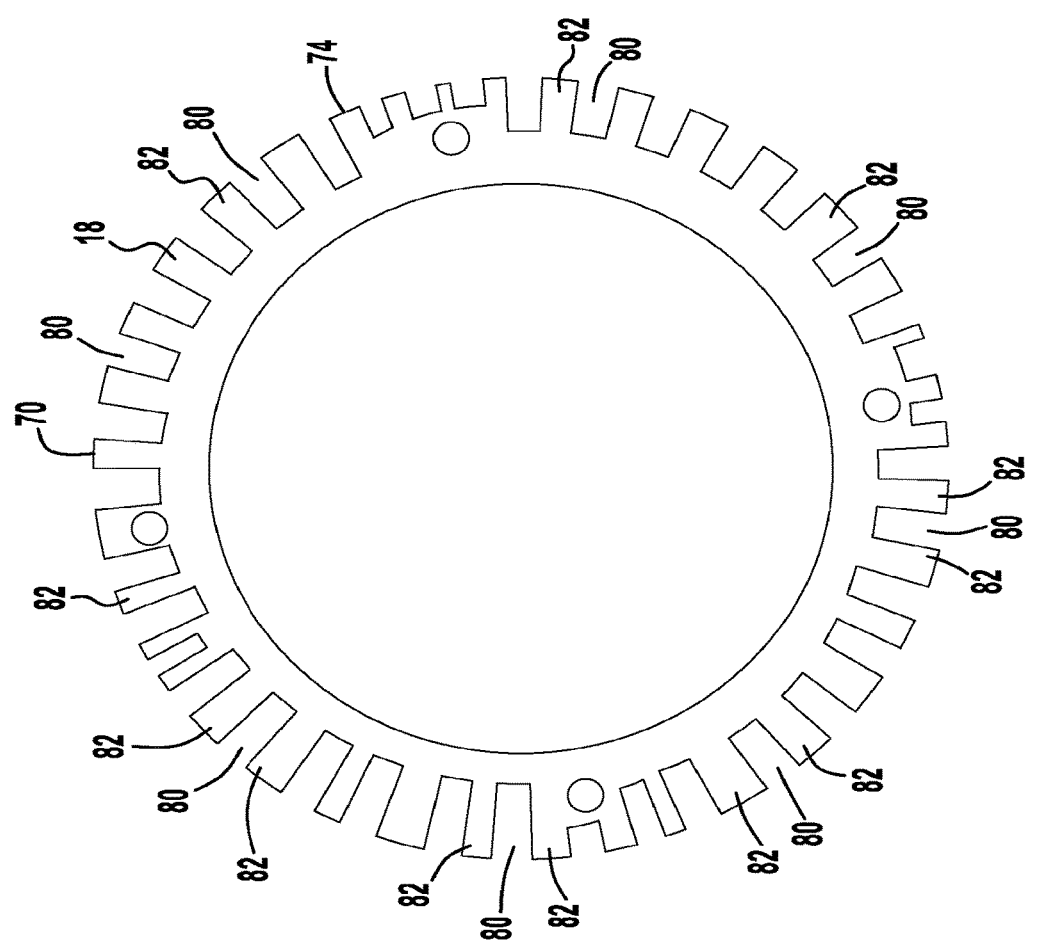
FIG. 10 is a top view of an exemplary embodiment of an adaptor for use in a drain installation.

In any of the installations described herein, the inner surface 20 of the drain conduit 14 may be tapered as indicated by dashed line 34 in FIG. 2A. Referring to FIGS. 1C and 10, the adaptor 18 may be configured to be flexed radially inward to accommodate the varying size of the inner surface 20 of the drain conduit. Referring to FIGS. 11A and 11B, the adaptor 18 may include an expandable portion 88 that expands radially outward into contact with the inner surface 20 of the drain conduit 14 to secure the adaptor to the drain conduit. This configuration also accommodates drain conduit inner surfaces 20 that vary in size.

Another embodiment of the drain assembly is illustrated by FIGS. 12-22D. This exemplary embodiment is illustrated as a barrel drain, however, the embodiment may be implemented with other types of drains, such as for example, types of commercial floor drains and shower drains. Exemplary product offerings of these types of drains may be found in the 2012 OATEYSCS Supply Chain Services catalog, which is incorporated herein by reference in its entirety. The adaptors 18 may be configured to be used with any drain offered in the 2012 OATEYSCS Supply Chain Services catalog. For example, the adaptors 18 may be configured to be used in the barrel-type drains offered in "Category 22—Commercial Drainage", Oatey SCS Product Catalog, No. 201 (2012), and "Category 9—Drains and Closet Flanges", Oatey SCS Product Catalog, No. 72 (2012), each of which is incorporated herein in its entirety. The adaptors 18 can be configured to be used with the 101 PS Series Solvent Weld Shower Drain, the 102 Series Solvent Weld Shower Drain with Receptor Base, the 103 Series Solvent Weld Shower Drain with Receptor Base, the 130 Series Shower Drain for Tile Shower Bases, the 131 Series Two Part Adjustable Slab Drain, the 151 Series Cast Iron and Plastic Two Part Shower Drain, the General Purpose Drain, the Four Way Area Drain, the Integral Trap Drain, the Commercial Drain—PVC Barrel with 5" Round Grate, the Commercial Drain—PVC Barrel with 5" Round Grate with Round Ring, the Commercial Drain—PVC Barrel with 5" Round Grate with Square Ring, the Commercial Drain—PVC Barrel with 6" Round Grate, the Commercial Drain—PVC Barrel with 6" Round Grate with Round Ring, the Commercial Drain—PVC Barrel with 6" Round Grate with Square Ring, the Commercial Drain—Cast Barrel with Round Grate in Round Top, Commercial Drain—Cast Barrel with Round Grate in Square Top; the Commercial Drain—Cast Barrel with Square Grate in Square Top; the PVC Barrel with 5" Round Grate drain, the PVC Barrel with 5" Round Grate with Round Ring drain, the PVC Barrel with 5" Round Grate with Square Ring drain, the PVC Barrel with 6" Round Grate drain, the PVC Barrel with 6" Round Grate with Round Ring drain, the Cast Barrel with 6" Round Grate with Square Ring drain, the Cast Barrel with Square Grate in Square Top drain, the Cast Barrel with Round Grate in Square Top drain, the Cast Barrel with Round Grate in Round Top drain products offered in the 2012 Oatey SCS Product Catalog. However, the adaptors disclosed by this patent application may be implemented in other types of drains, and in any drain assembly in which an adapter is generally securable to a drain pipe, or an extension of a drain pipe.

Figure 12:
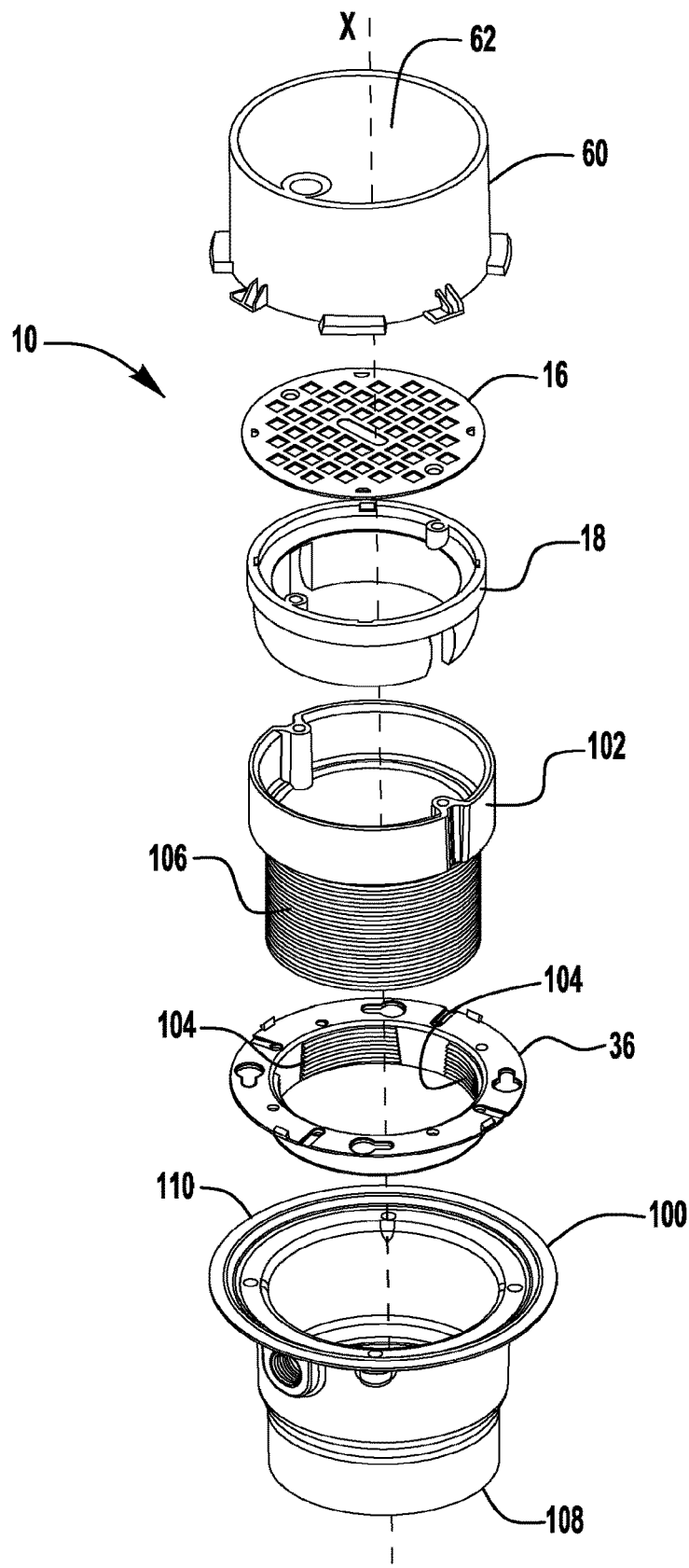
FIG. 12 is a perspective assembly view of an exemplary embodiment of a floor drain.
Figure 12A:
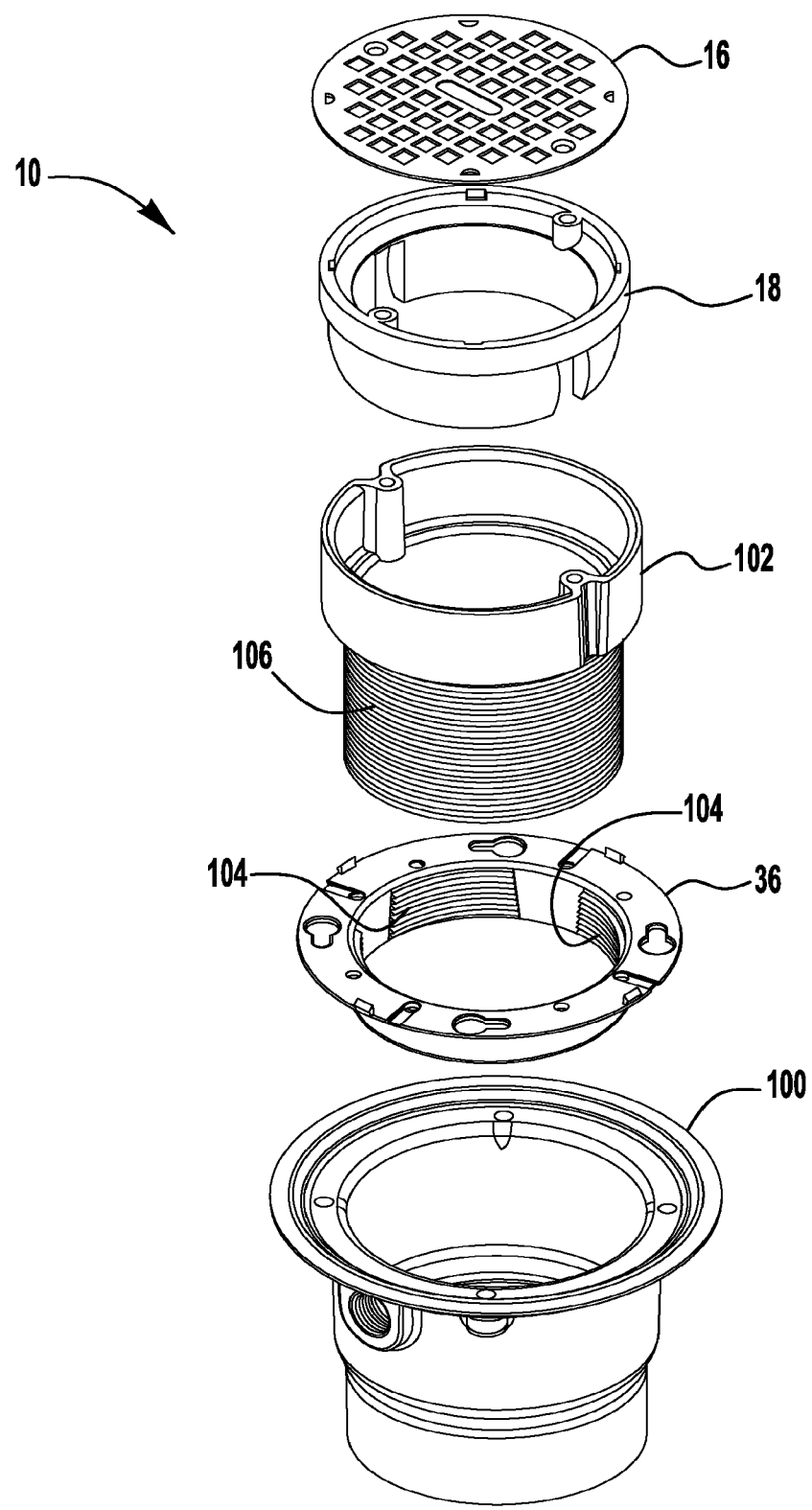
FIG. 12A is a perspective assembly view of the floor drain illustrated by FIG. 12, shown without a cover.
Figure 15:
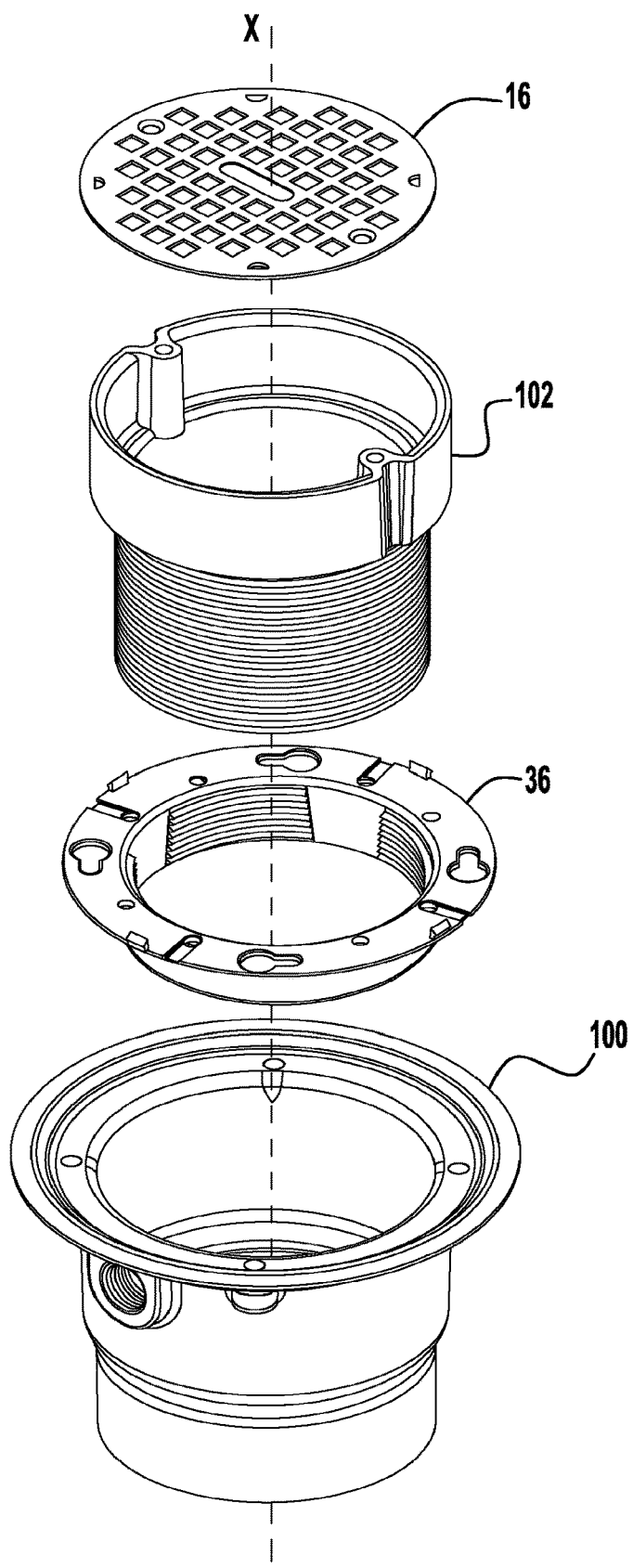
FIG. 15 is a perspective assembly view of a portion of the floor drain illustrated by FIG. 12.

FIGS. 12, 12A and 15 are perspective assembly views of the drain assembly 10, showing various portions of the assembly. Certain components of the drain assembly 10 are illustrated in FIGS. 16-21 and are discussed individually herein. This embodiment has similar components as other embodiments discussed herein. For example, the drain assembly includes a cover 60, a strainer 16, an adapter 18, and a flange 36. The assembly also includes a barrel 102 and a base 100. As assembled, the flange 36 is securable to the upper end 110 of the base 100. A lower end 108 of the base 100 is securable to a drain pipe 200 (see FIG. 22A). A barrel 102 is positionable within the flange 36 at a user determined height by mating of the male-threads 106 of the barrel with the female-threads 104 of the flange 106. As illustrated, certain components of the drain assembly are positioned in a co-axial relationship relative to the drain assembly axis X. In this exemplary embodiment, the conduit 14 that provides the flow path F comprises the drain pipe 200, the base 100, and the barrel 102

Figure 16:
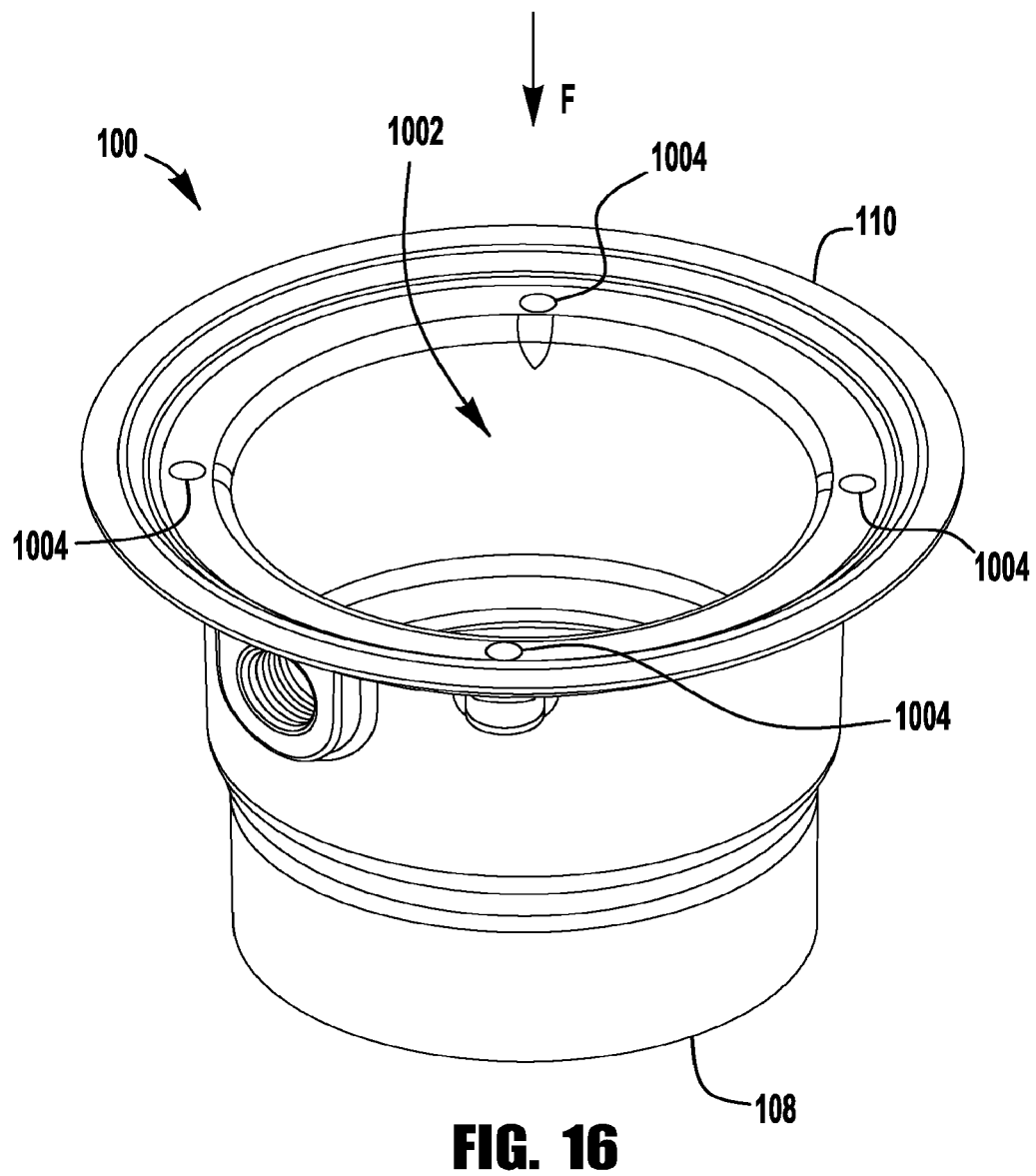
FIG. 16 is a perspective view of an exemplary embodiment of a base.

Components of the drain assembly 10 are illustrated in FIGS. 16-21. A base 100 is illustrated in FIG. 16. The base has a bottom end 108 cooperatively shaped for attachment to a drain pipe, such as for example, a drain pipe 200 as illustrated in FIG. 22A. As illustrated in FIG. 22A, the base 100 has a common longitudinal axis X with the drain pipe 200, and may function as an end of the drain pipe 200. An inside surface 1002 of the base 100 may define a fluid flow path F, in which the fluid flow path is common with the fluid flow path of the drain pipe 200. The upper end 110 of the base 100 defines apertures 1004 for connectors, such as for example, for screws, to attach other components of the drain assembly, such as for example, the flange 36.

Figure 17:
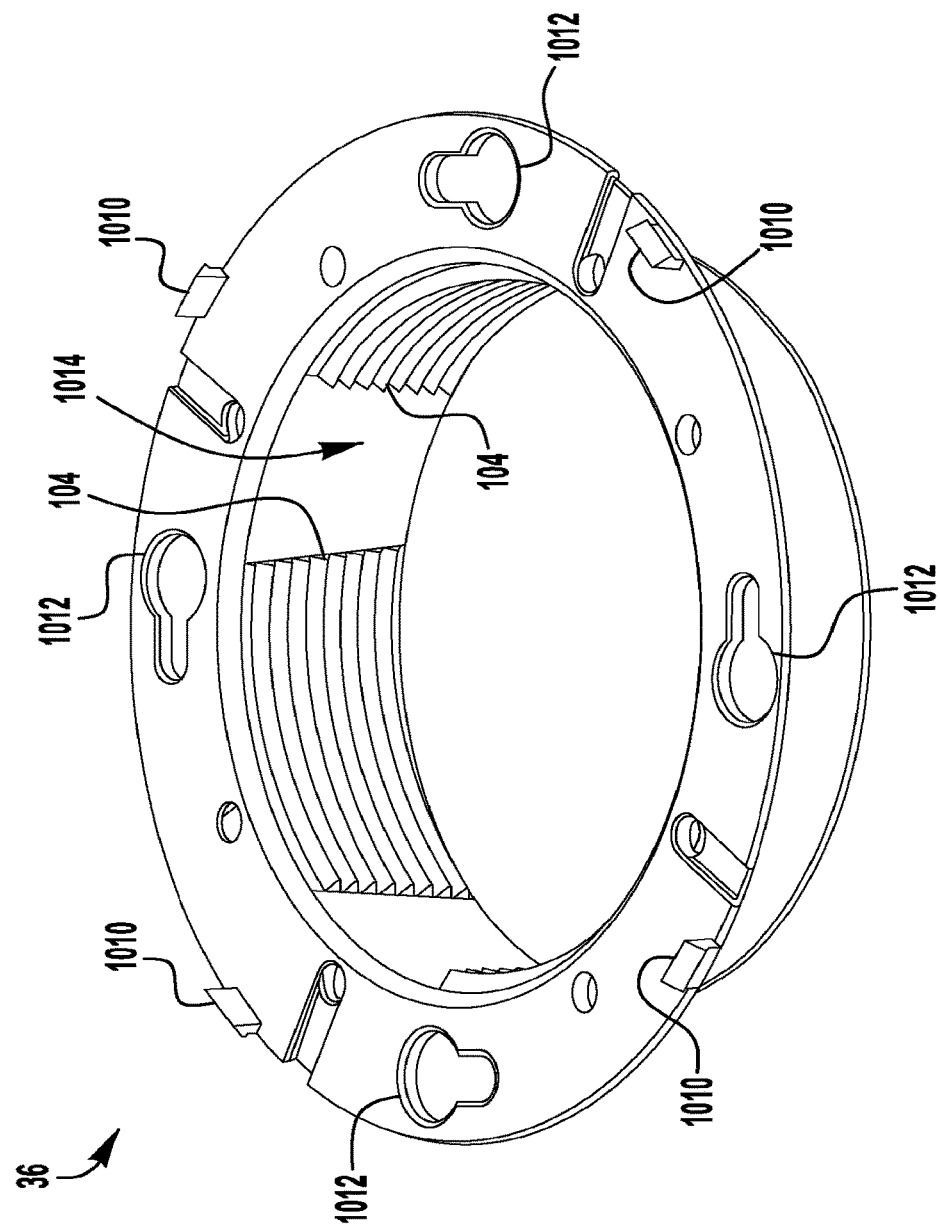
FIG. 17 is a perspective view of an exemplary embodiment of a flange.

Referring to FIG. 17, a flange 36 is illustrated. As discussed herein, the flange 36 may take a wide variety of different forms. In the illustrated embodiment, the flange 36 is a separate component that is assembled to the base 100. The flange 36 includes at least one internal threaded portion 104 for attachment to the barrel 102. Upwardly extending tabs 1010 are cooperatively shaped to mate with snap-on connectors of the cover 60. An inside surface 1014 of the flange 36 does not directly define a fluid flow path and is adjacent to the barrel 102.

Figure 18:
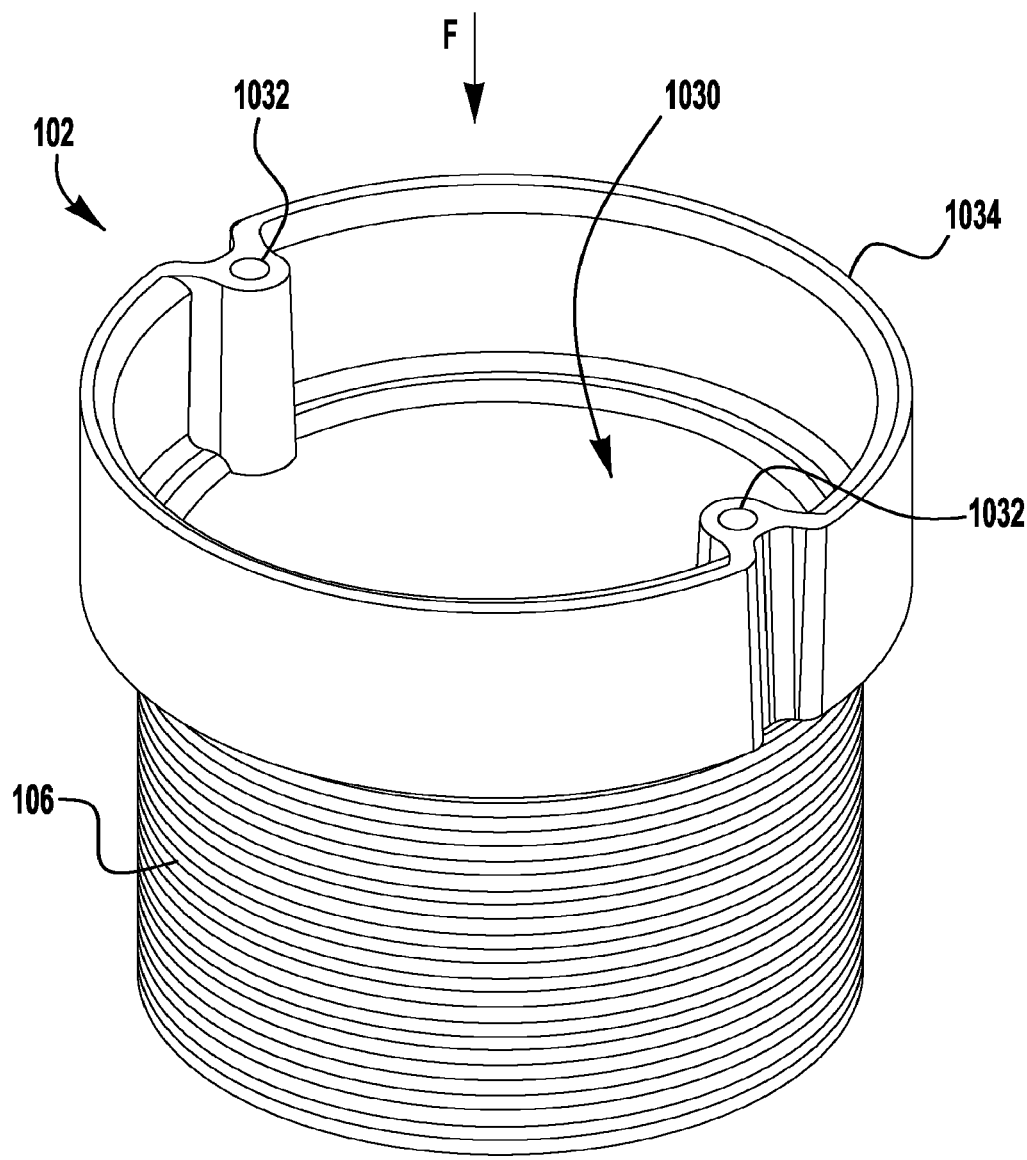
FIG. 18 is a perspective view of an exemplary embodiment of a barrel.
Figure 22A:
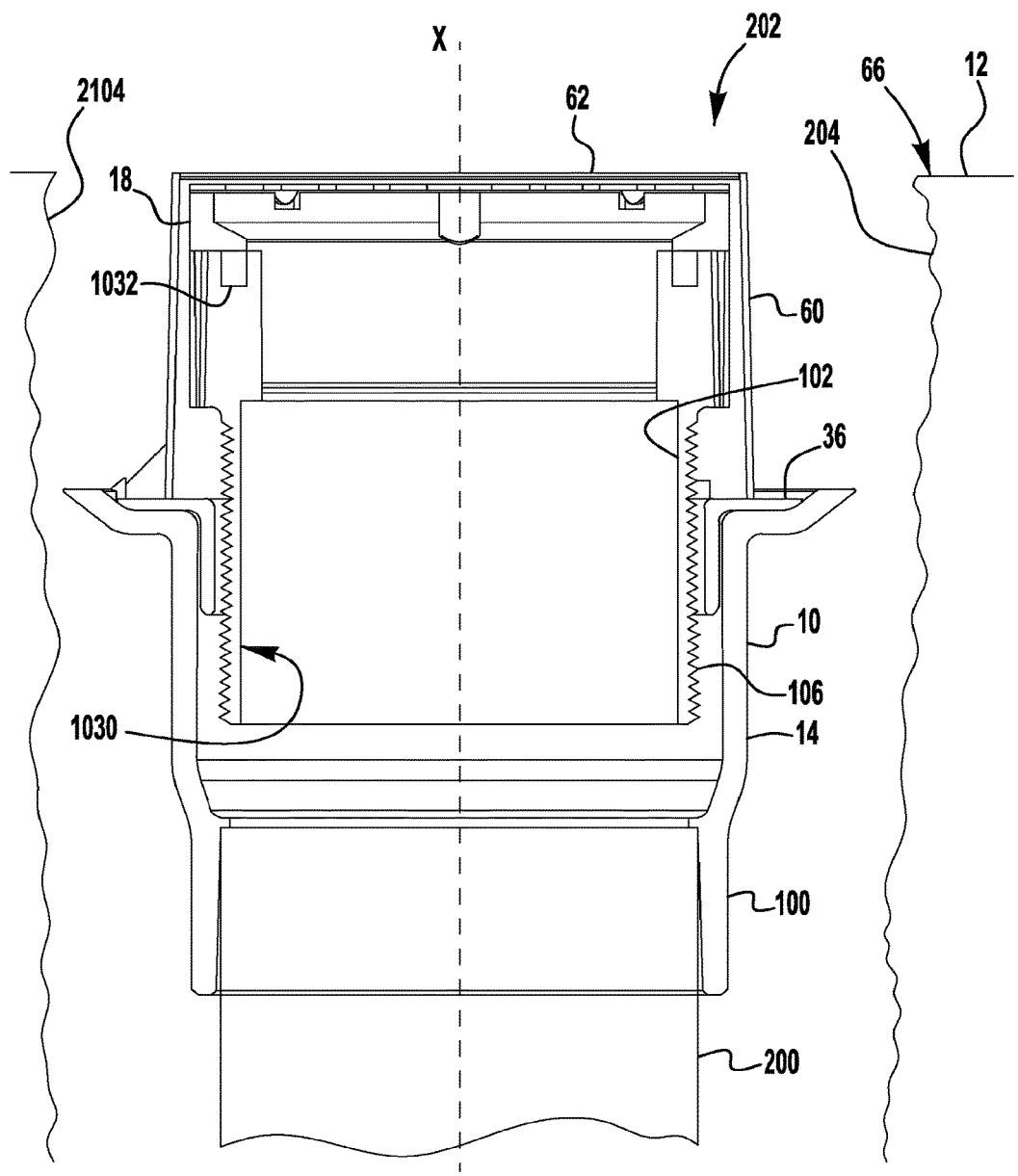
FIG. 22A is a sectional view of an exemplary embodiment of a drain installation, illustrated prior to a substratum disposed around a drain conduit.

FIG. 18 illustrates the barrel 102 of this embodiment. In the illustrated embodiment, the assembly height of the barrel relative to the floor is adjusted by a user. An inside surface 1030 of the barrel 102 may define a fluid flow path F, in which the fluid flow path is common with the fluid flow path of the drain pipe 200. As such, the barrel 102 and the drain pipe 200 form a portion of the conduit 14. As illustrated by FIGS. 13C and 22D, for example, a top surface 1034 of the barrel may limit insertion depth of the adaptor 18. Apertures 1032 in the top surface 1034 of the barrel may be used for connectors, such as for example, for screws, to attach other components of the drain assembly, such as for example, the strainer 16 or the adapter 18.

Figure 19:
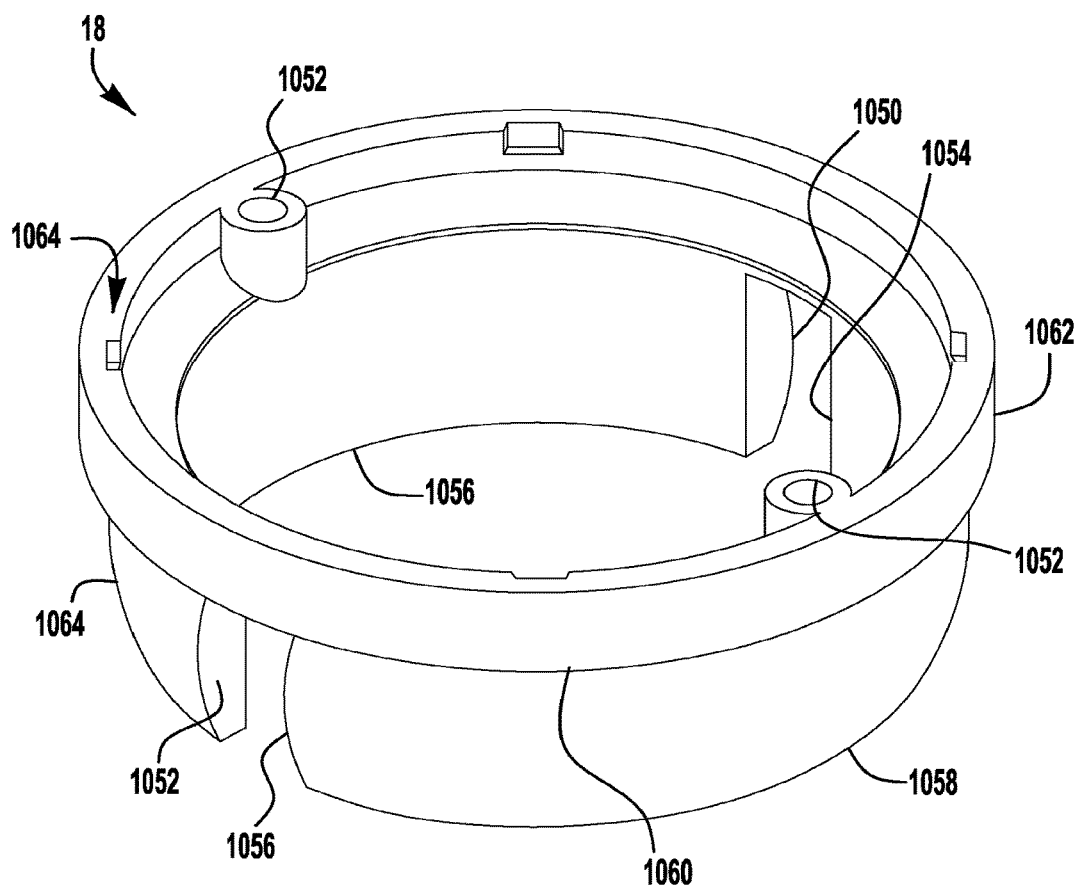
FIG. 19 is a perspective view of an exemplary embodiment of an adaptor.

Referring now to FIG. 19, an adapter 18 is illustrated. The adapter is configured for adjustable insertion into the drain assembly. Specifically, the adaptor 18 is insertable into the top end of the barrel 102, as illustrated, for example, in FIGS. 13B and 14A. The adapter generally is formed of two portions, a top ring 1062 and a lower ring 1064. The lower ring 1064 includes two wings, 1056, 1058, each defined by wall cuts in the lower ring, 1050, 1052 and 1054, 1056, respectively. The wings 1056, 1058 allow the lower ring 1064 to be press fit into the barrel at a user determined orientation. The wings, 1056, 1058 may be rigid or flexible. In an inserted portion, the top surface 1064 of the top ring 1062 is generally along the same plane, or a parallel plane, with respect to the floor 12 or the top surface 96 of the substratum 92 (see FIG. 22D). A lower surface of the top ring 1062 may contact a top surface 1034 of the barrel 102, as illustrated by FIGS. 13C and 22D or there may be a gap between the top ring 1062 and the top surface 1034. Apertures 1052 in the top surface 1064 of the adaptor 18 may be used for connectors, such as for example, for screws, to attach other components of the drain assembly, such as for example, the strainer 16.

Figure 20:
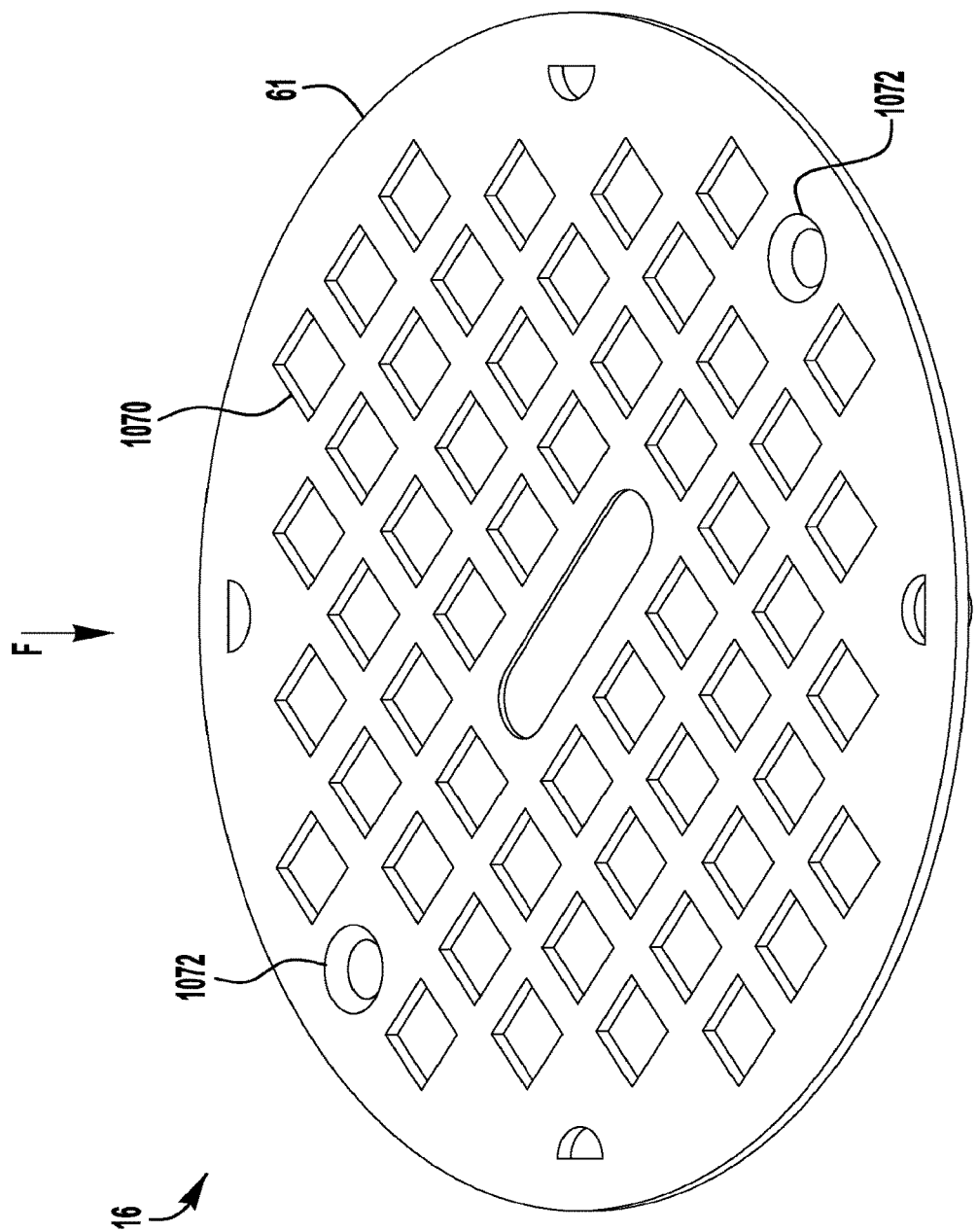
FIG. 20 is a perspective view of an exemplary embodiment of a strainer.

Referring now to FIG. 20, a strainer 16 or grate is illustrated. As discussed, the strainer 16 can take a wide variety of different forms. The strainer 16 can be any conventional strainer or grate or the strainer may be specially configured to be connected to the adaptor 18. In application, fluid passes through the strainer along a fluid flow path F, in which the fluid flow path is common with the fluid flow path of the drain pipe 200. The illustrated strainer 16 is a circular disk 61 having a plurality of openings 1070. Apertures 1072 in the circular disk 61 may be used for connectors, such as for example, for screws, to attach the strainer 16 to other components of the drain assembly, such as for example, the adapter 18.

Figure 21:
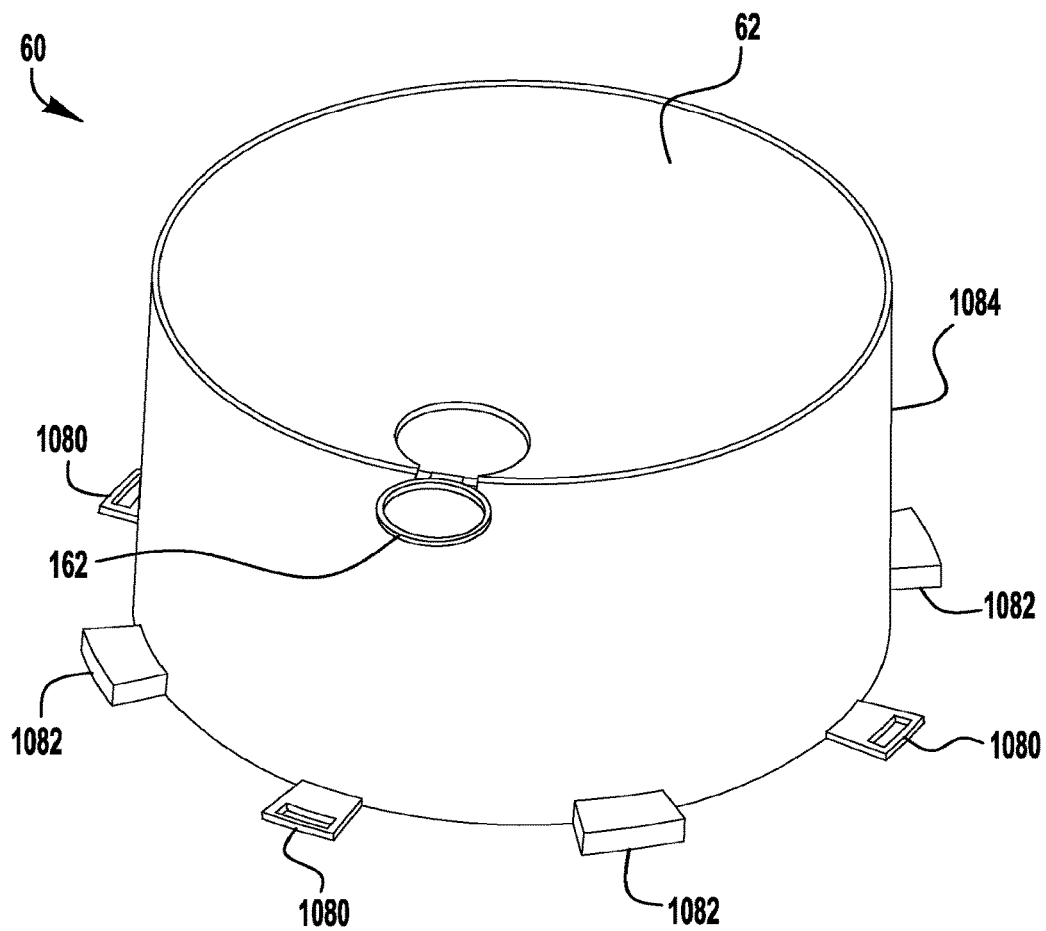
FIG. 21 is a perspective view of an exemplary embodiment of a cover.

FIG. 21 illustrates the cover 60 of this embodiment. In one exemplary embodiment illustrated by FIG. 21, an optional removable cap 62 may be provided on the cover 60. The optional removable cap 62 may take a wide variety of different forms. The removable cap 62 of the cover 60 prohibits substratum from entering the conduit in a filling step. In one exemplary embodiment, the removable cap 62 includes a pull tab 162 which a user may use to remove the cap 62. The base 184 of the cover 60 include protruding tabs cooperatively shaped to attach to other components of the drain assembly, such as for example, the upwardly extending tabs 1010 of the strainer 36. Other protruding blocks 1082 may contact the strainer and position the cover in a co-axial relationship with the strainer 36. In assembly, the walls of the base 184 are cut to provide a desired engagement surface for the adaptor 18.

Figure 13:
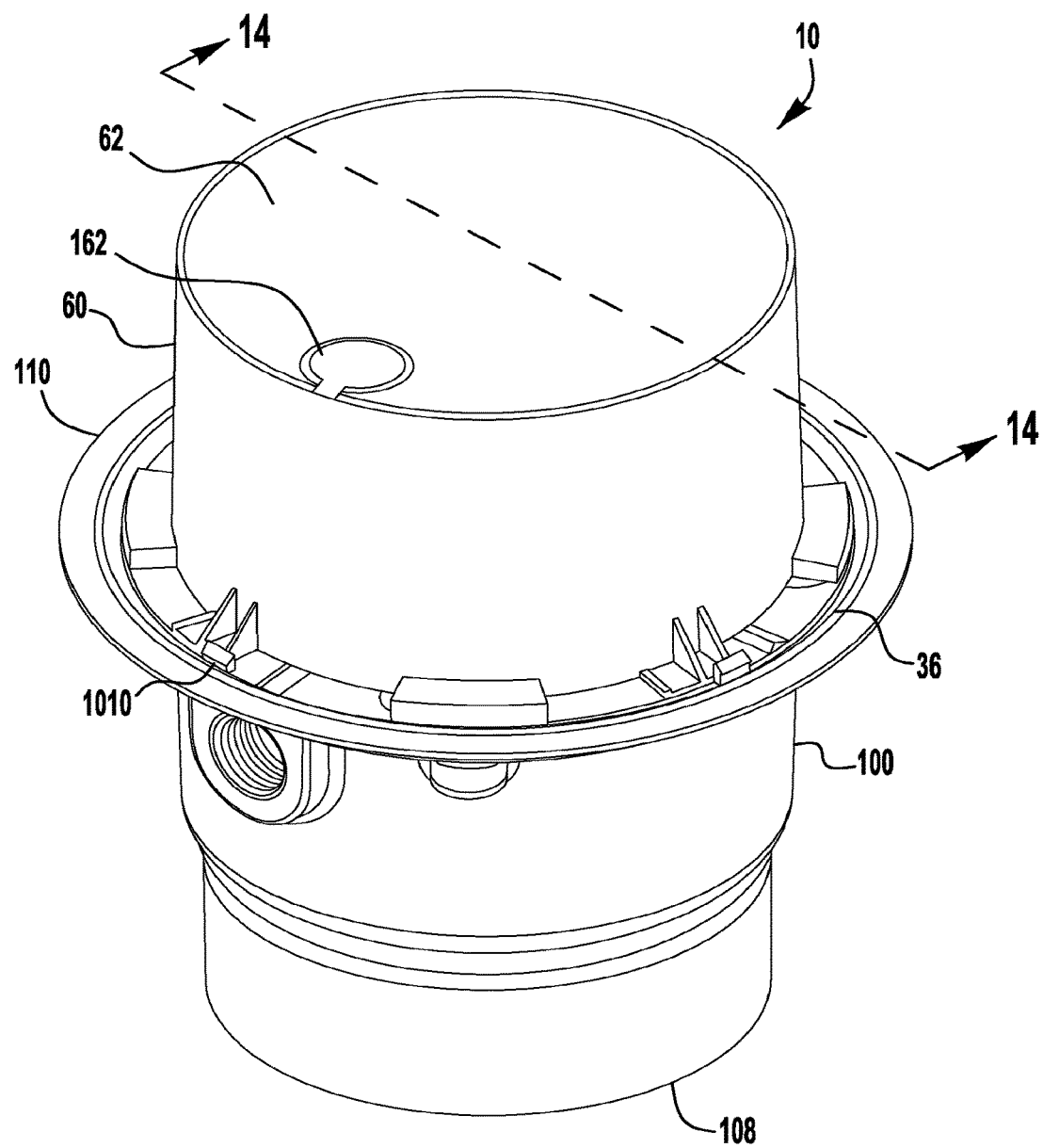
FIG. 13 is a perspective view of the floor drain illustrated by FIG. 12.
Figure 13A:
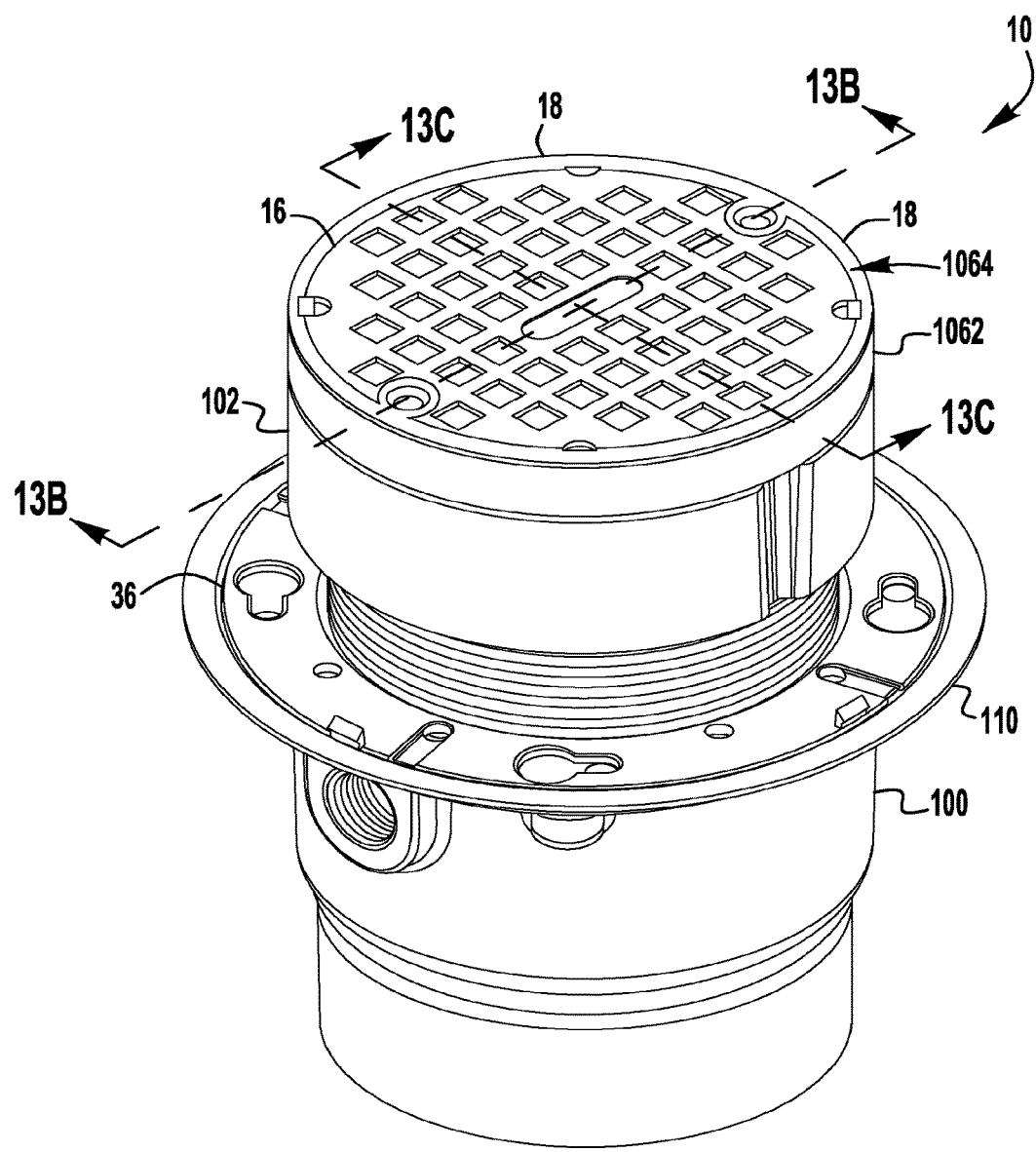
FIG. 13A is a perspective view of the floor drain illustrated by FIG. 12, shown without the cover.
Figure 13B:
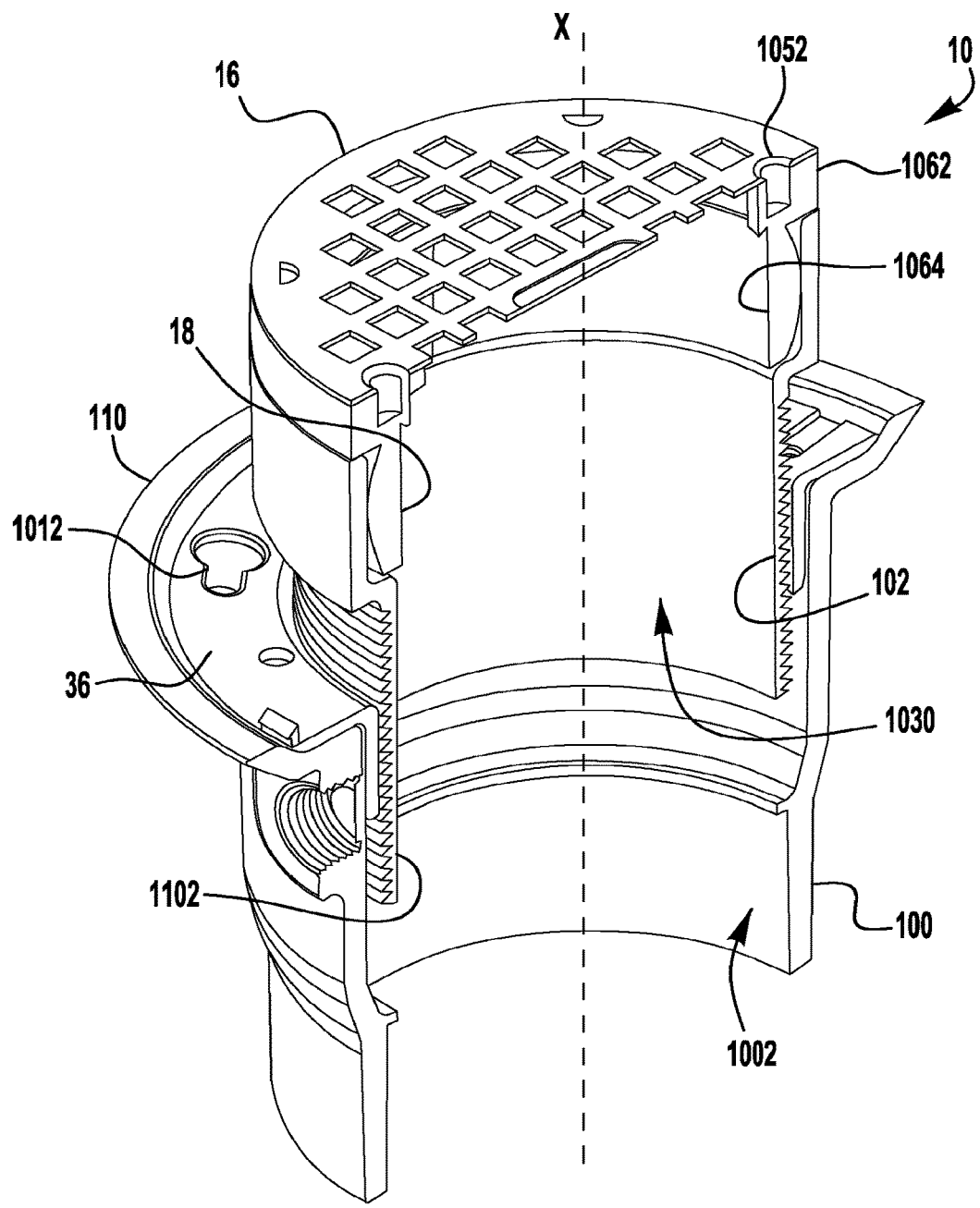
FIG. 13B is a perspective view of the floor drain illustrated by FIG. 12, shown along the lines 13B-13B of FIG. 13A.
Figure 13C:
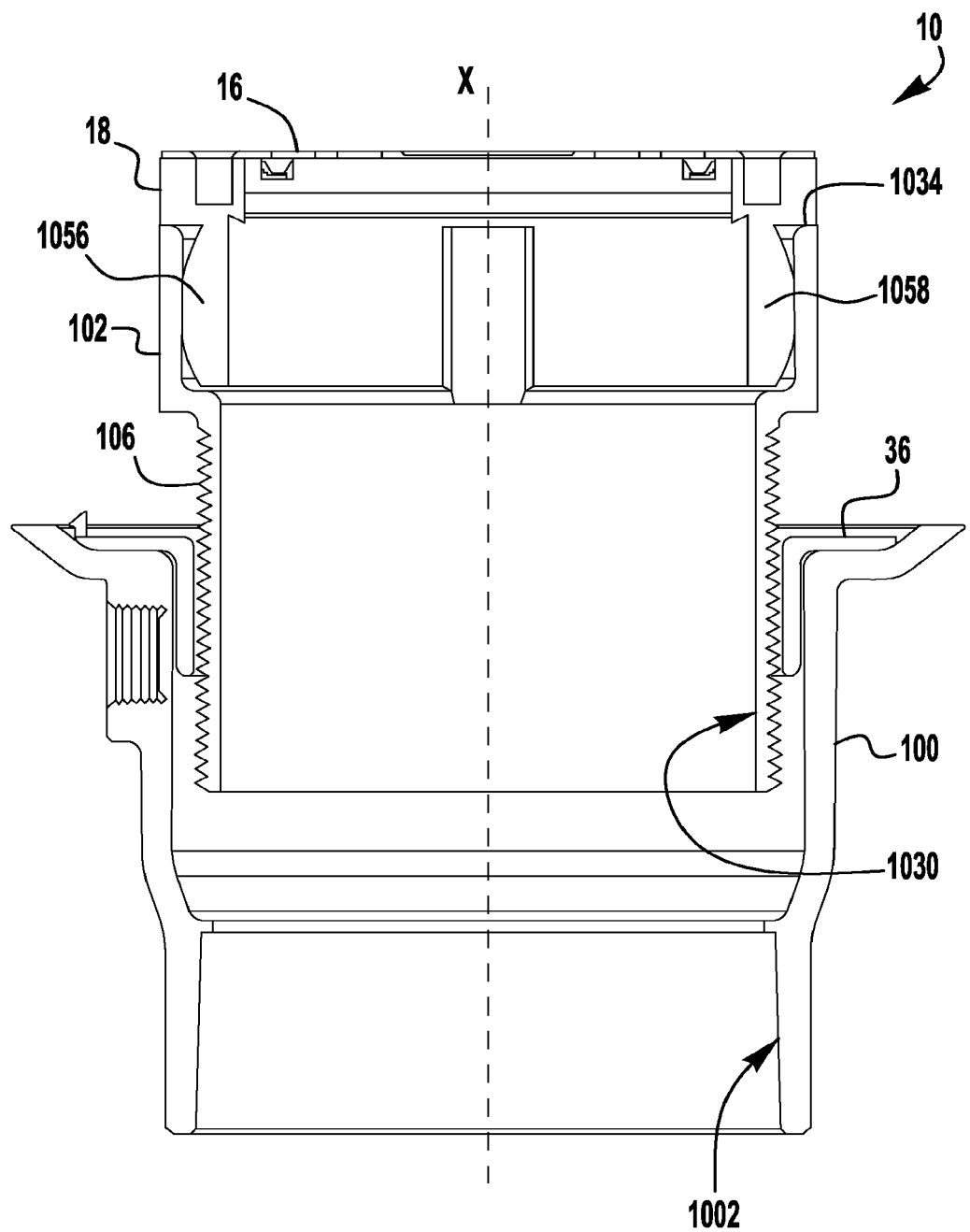
FIG. 13C is a front view of the floor drain illustrated by FIG. 12, shown along the lines 13C-13C of FIG. 13A.

FIGS. 13-15C are various perspective and sectional views of the drain assembly 10. FIG. 13 illustrates the drain assembly 10 with generally all components assembled together, but not in an application environment, such as for example, connected to a drain pipe. In the example illustrated by FIGS. 13-15C, the adaptor 18 is provided as a part of the drain assembly 10. In another embodiment, the adaptor 18 is a separate part that is sold separately from the drain assembly 10. In an exemplary embodiment, the adaptor can be used with currently available drain assemblies, including, but not limited to, any of the drain assemblies available from Oatey Co. that are mentioned above. The drain assembly 10 is illustrated in FIG. 13A without the cover 60 to illustrate additional detail. Section views of the drain assembly 10 of FIG. 13A are illustrated in FIGS. 13B and 13C. Specifically, FIG. 13B is a perspective view shown along the lines 13B-13B of FIG. 13A and FIG. 13C is a front view shown along the lines 13C-13C of FIG. 13A.

Figure 14:
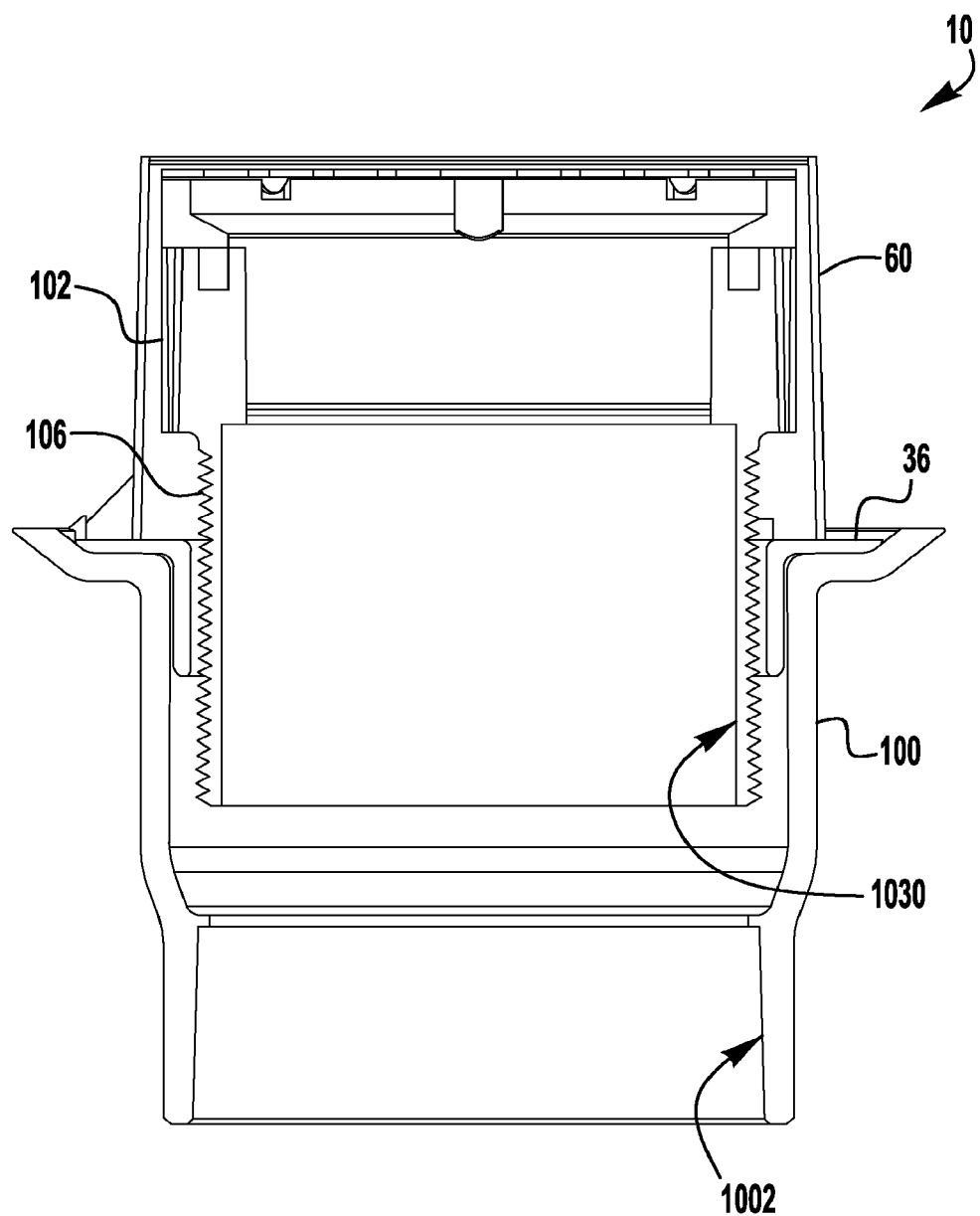
FIG. 14 is a front schematic view of the floor drain illustrated by FIG. 12, shown along the lines 14-14 of FIG. 13.
Figure 14A:
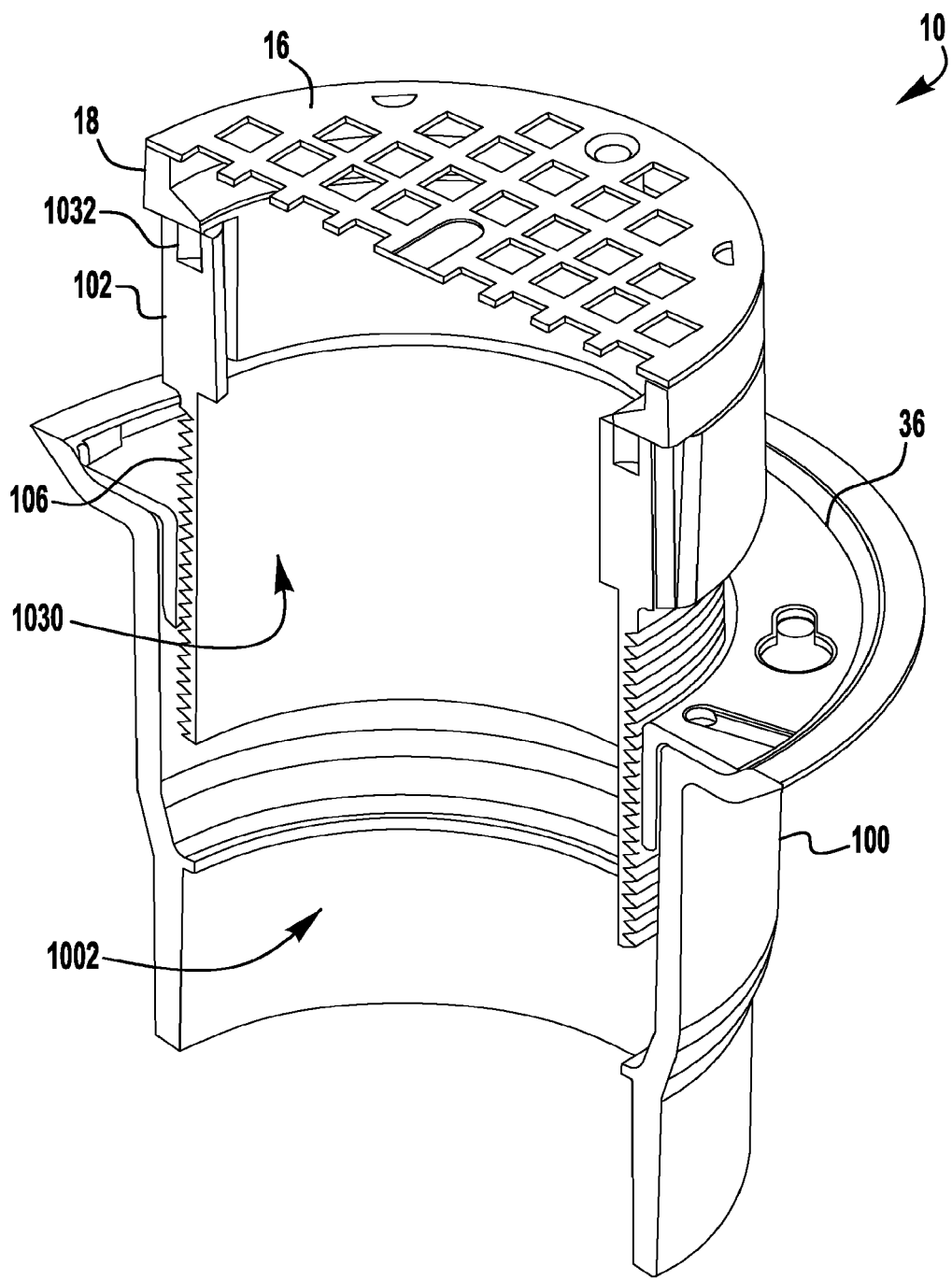
FIG. 14A is a perspective view of the floor drain illustrated by FIG. 12, shown along the lines 13C-13C of FIG. 13A.

Additional views are seen in FIGS. 14 and 14A. Referring to FIG. 14, a front schematic view of the drain assembly 10 is shown along the lines 14-14 of FIG. 13. In FIG. 14A, a perspective view of the drain assembly 10 is shown along the lines 13C-13C of FIG. 13A.

Figure 15A:
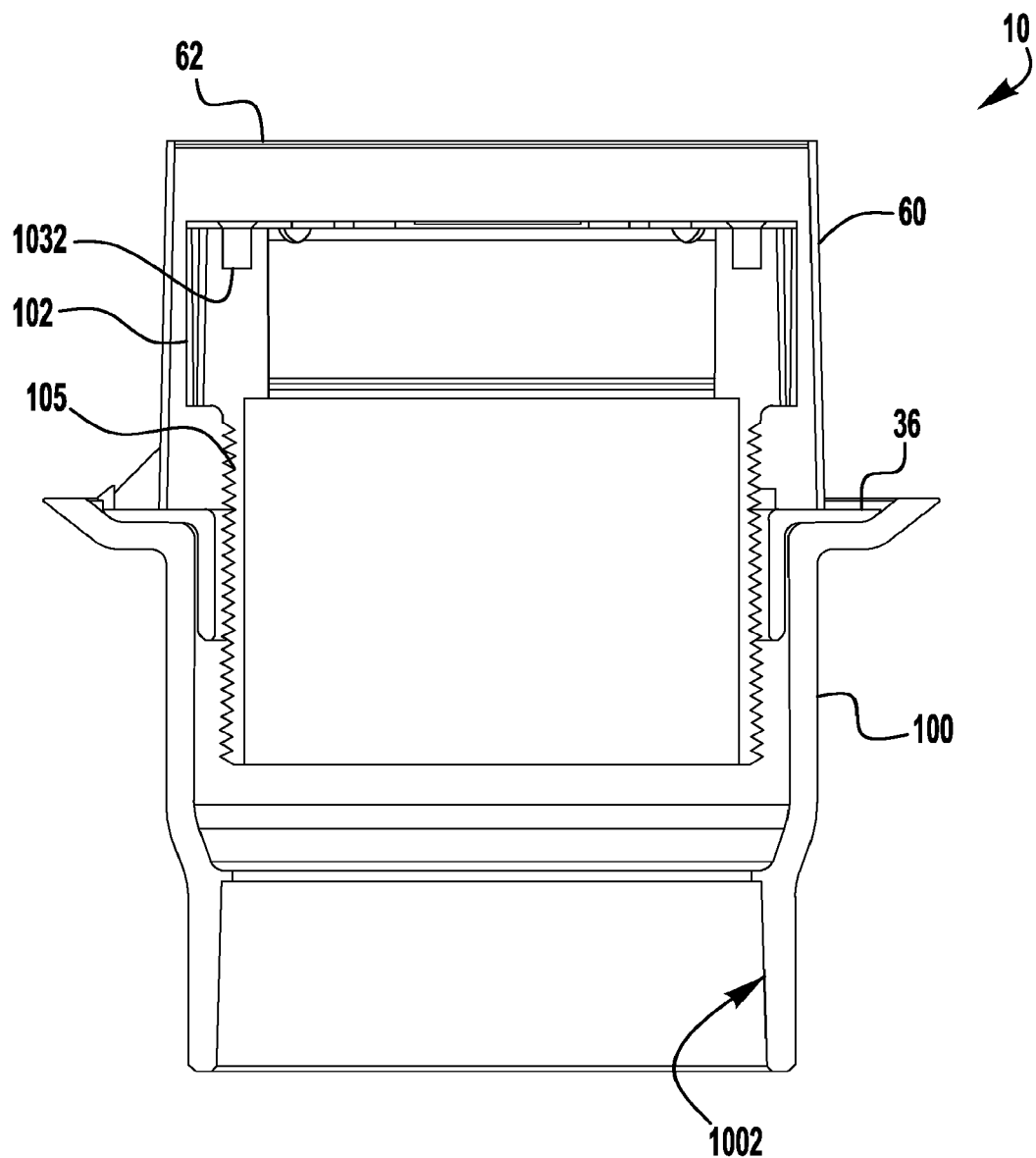
FIG. 15A is a front view of the floor drain illustrated by FIG. 12, shown along the lines 15C-15C of FIG. 15B.
Figure 15B:
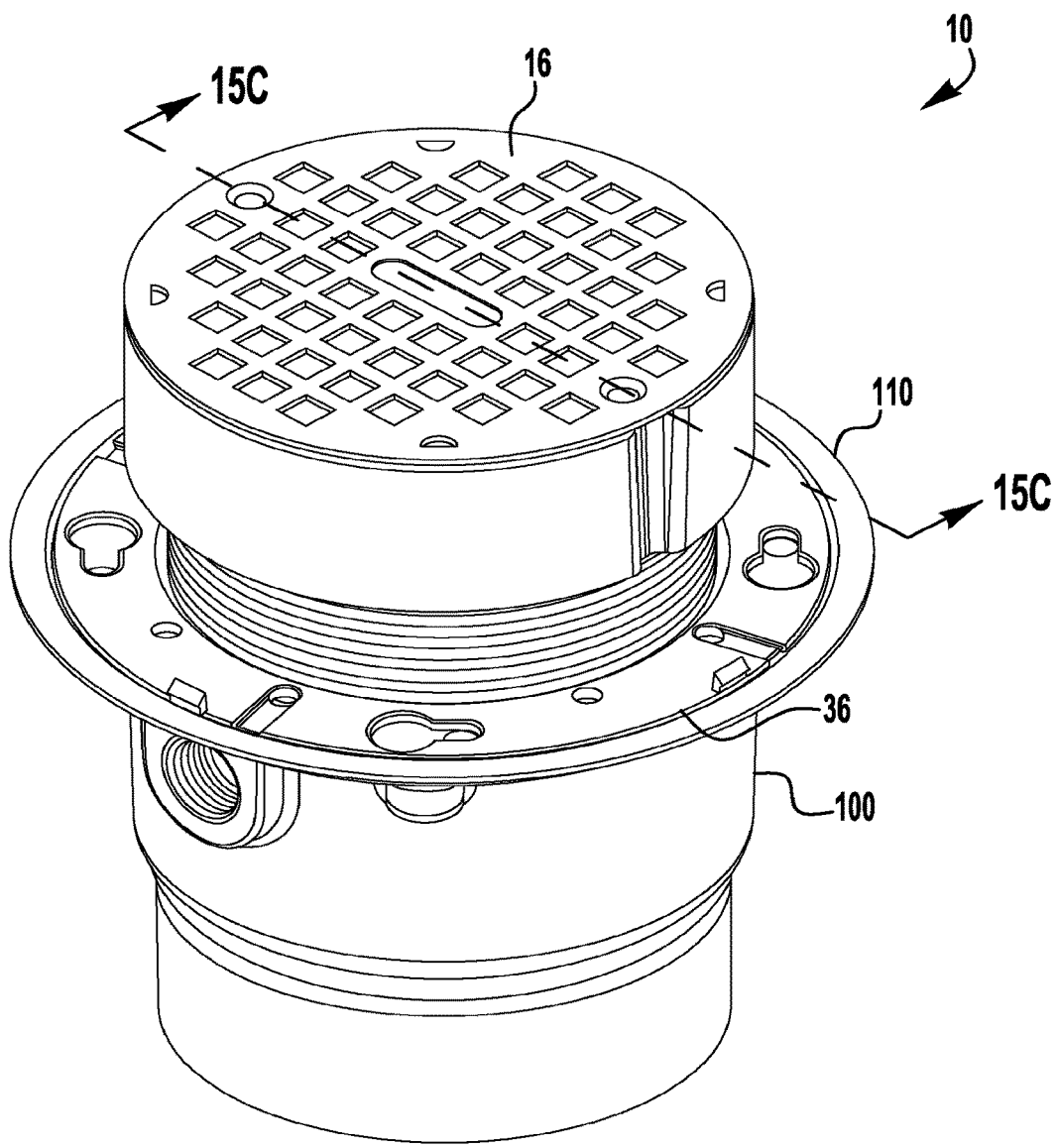
FIG. 15B is a perspective view of the floor drain illustrated by FIG. 12, shown without the cover and without the adaptor.
Figure 15C:
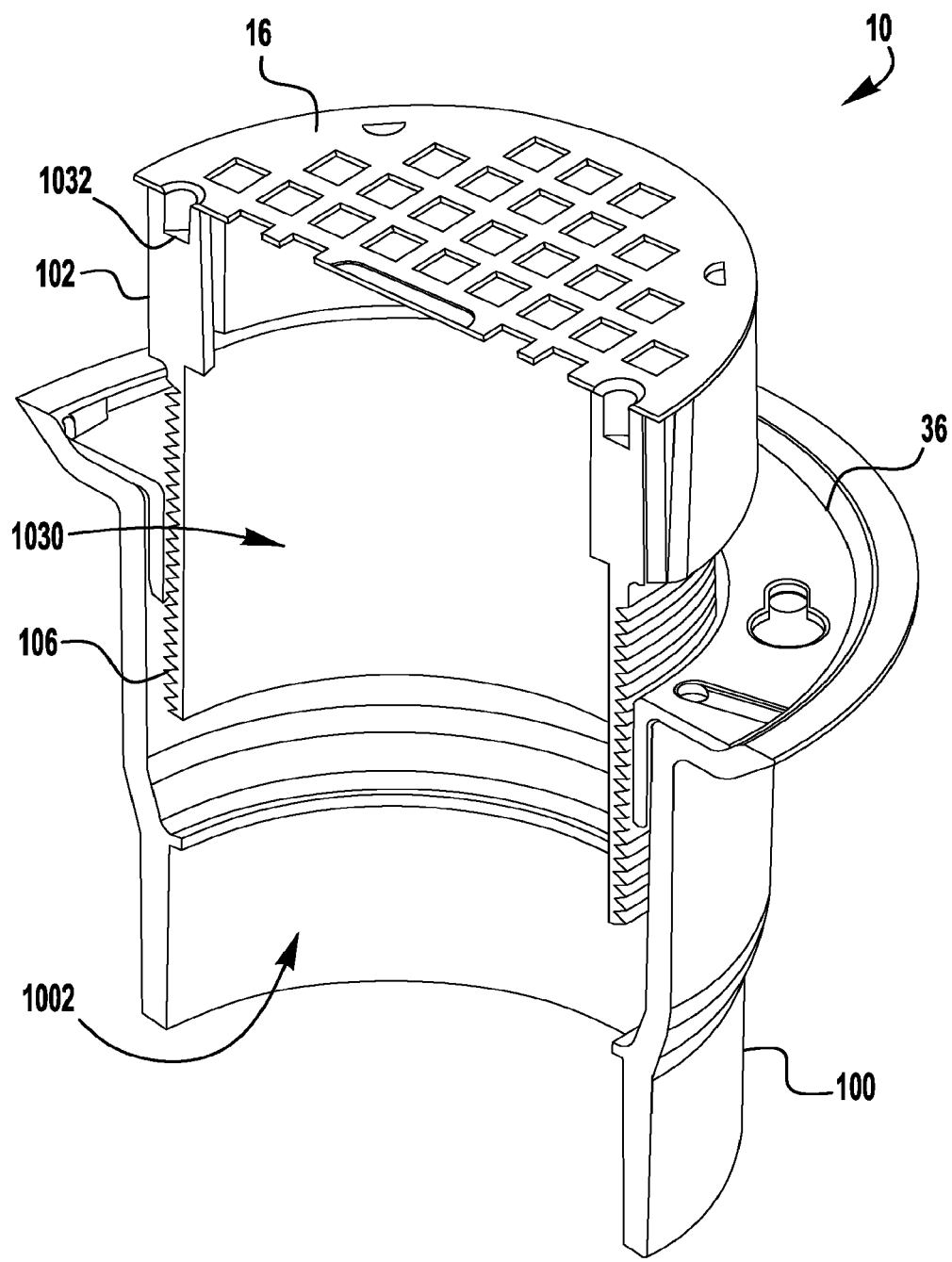
FIG. 15C is a perspective view of the floor drain illustrated by FIG. 12, shown along the lines 15C-15C of FIG. 15B.

FIGS. 15A-15B illustrates the drain assembly 10 without the cover 60 and without the adapter 18. Section views of the drain assembly 10 of FIG. 15B are illustrated in FIGS. 15A and 15C. Specifically, FIG. 15C is a perspective view shown along the lines 15C-15C of FIG. 15B and FIG. 15A is a front view of FIG. 15C.

Figure 22B:
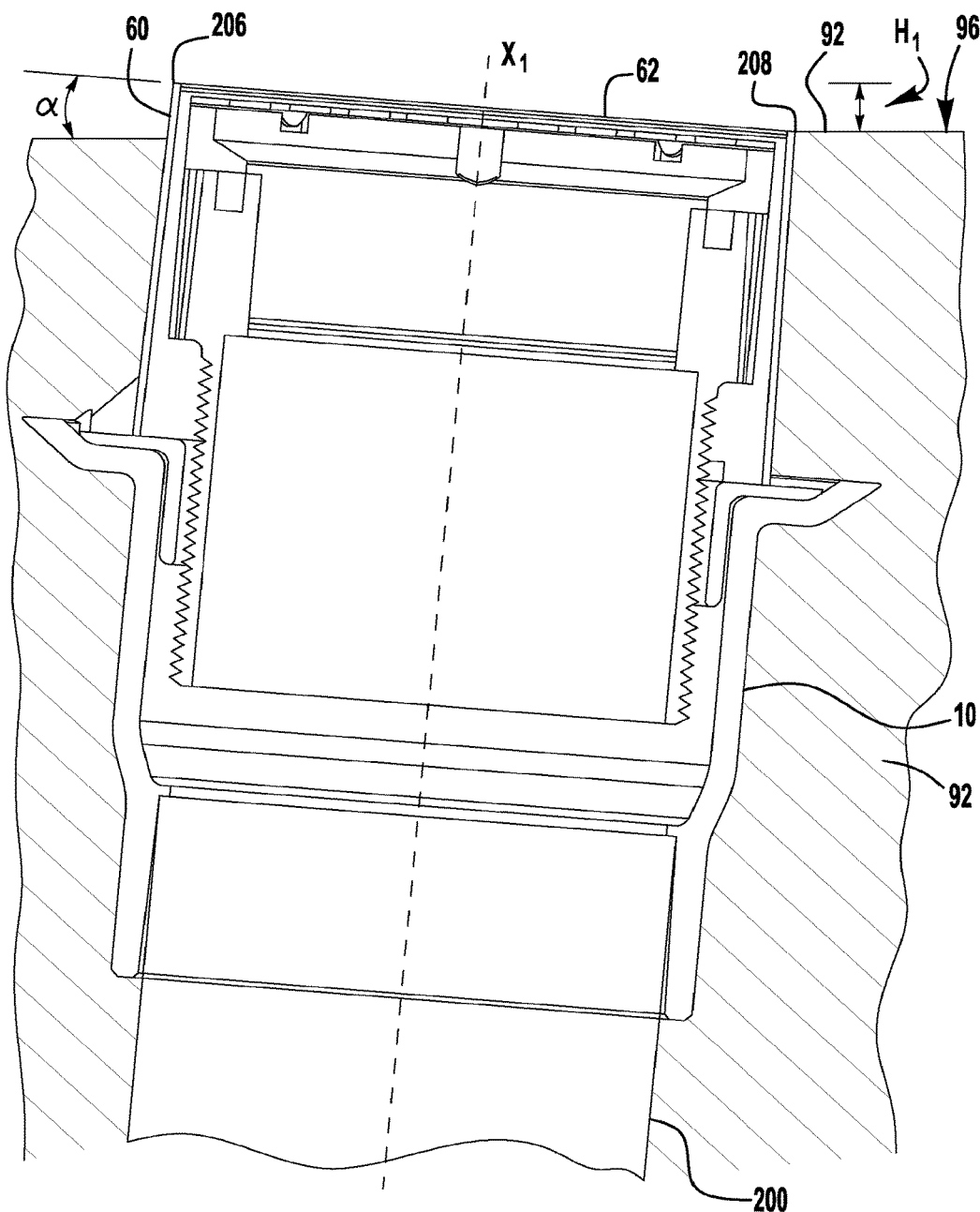
FIG. 22B is a sectional view of an exemplary embodiment of a drain installation, illustrated with a substratum disposed around a drain conduit.
Figure 22C:
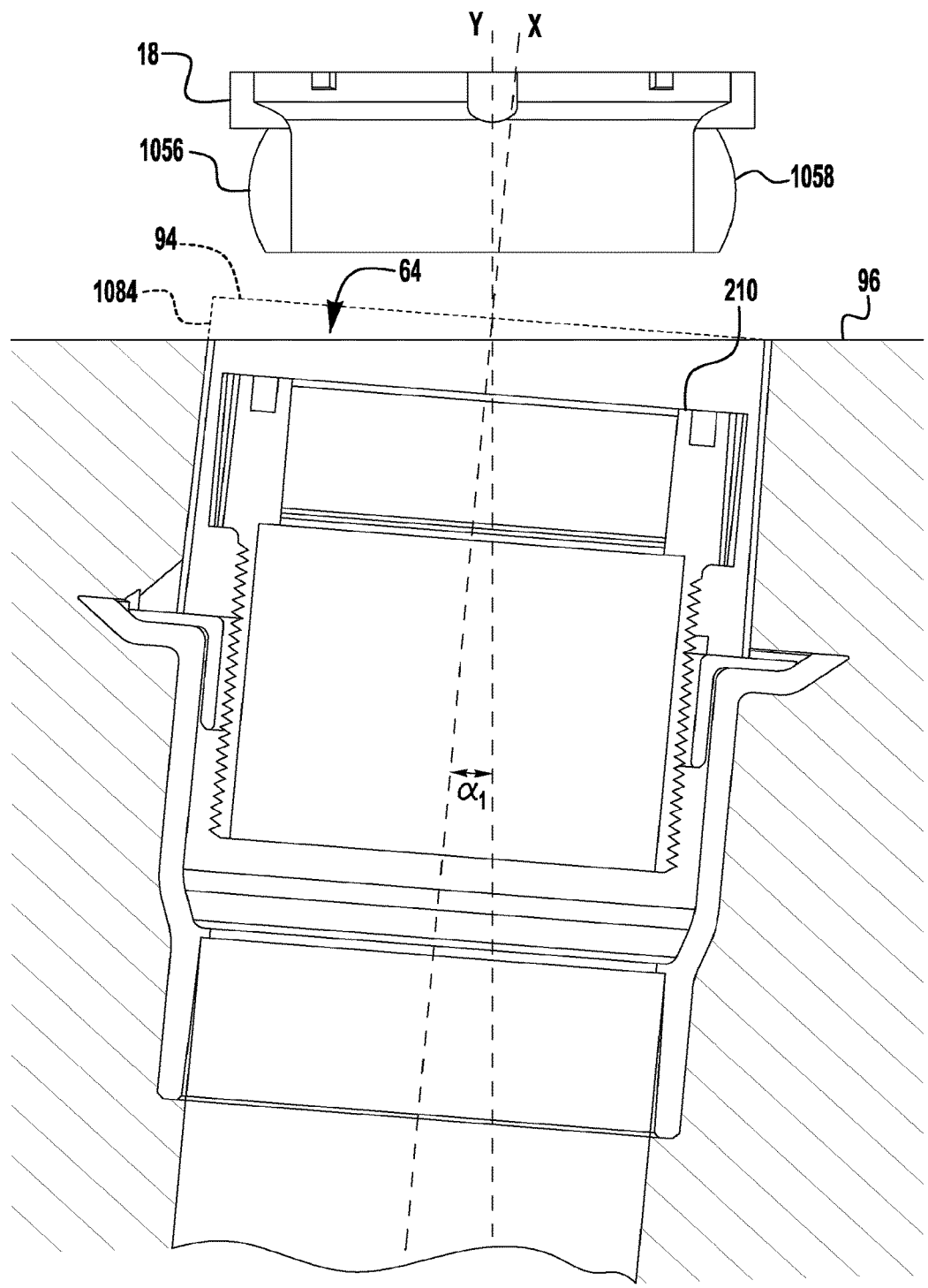
FIG. 22C is a sectional view of an exemplary embodiment of a drain installation, shown with a substratum disposed around a drain conduit and an adaptor removed.
Figure 22D:
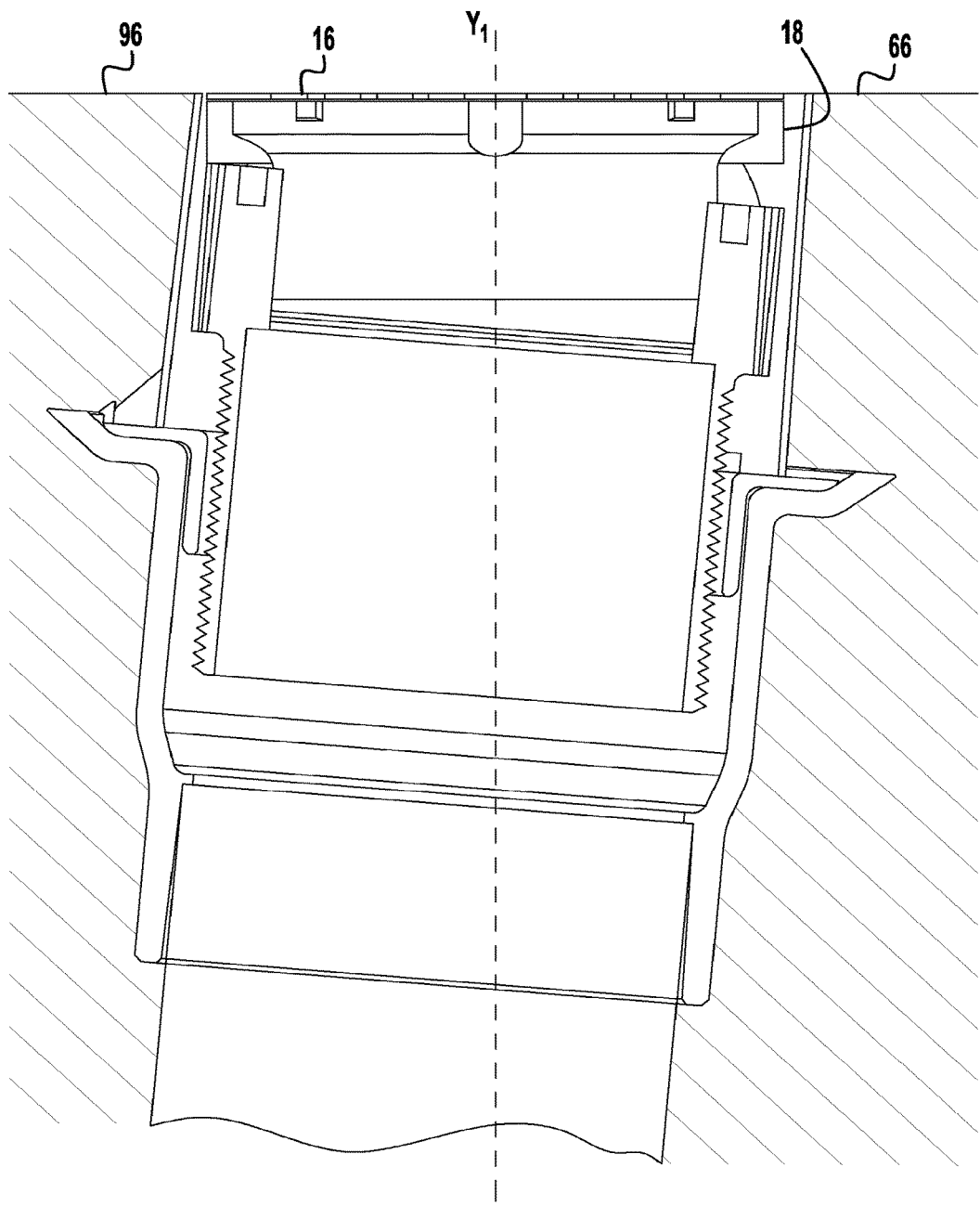
FIG. 22D is a sectional view of an exemplary embodiment of a drain installation, shown with a substratum disposed around a drain conduit and an adaptor installed

FIGS. 22A-22C illustrate an exemplary embodiment of a method of installing a drain assembly 10 in a floor 12. The method provides for a situation in which the drain assembly 10 is tilted in the floor 12. Referring to FIG. 22A, a cavity 200 within the floor 12 is defined in part by the internal walls 204 of a cavity 202. The drain assembly 10 is secured to a pipe 200 and the assembly and pipe are disposed at least partially within the cavity 202. The barrel 102 is adjustable within the flange 36 to generally the same height as the floor 12. The drain assembly 10 is disposed along an axis X generally perpendicular to the top surface 66 of the floor. As discussed herein, the removable cap 62 of the cover 60 prohibits substratum from entering the conduit in a filling step.

Referring now to FIG. 22B, a substratum 92 is provided around the drain assembly 10 and pipe 200. For example, cement or concrete may be poured around the drain assembly 10 and pipe 200. When cement 92 is poured around the drain conduit 14, the heavy cement may cause the drain conduit 14 to tilt from a vertical position as illustrated in FIG. 22A, to a position illustrated in FIG. 22B. In the illustrated position, the drain assembly 10 is disposed with an axis X which is no longer generally perpendicular to the floor top surface. In this position, a high point 206 of the cover 60 is at a height H above the top surface 96 of the substratum 92, such that the top surface of the cover 62 is at an angle α with respect to the top surface 96 of the substratum 92. A low point 208 of the cover 62 is generally flush with the top surface 96 of the substratum 92. However, the illustrated position of the drain assembly relative to the top surface 96 of the substratum is for example only, and a drain assembly of the present invention can be installed with the drain assembly at a variety of heights relative to the top surface of the substratum, and a variety of angles relative to the top surface of the substratum.

Referring to FIG. 22C, a top end 94 of the cover 60 is cut off after the cover 62 has been removed. For example, the cover 60 may be cut so that the cut end is flush with the top surface 96 of the substratum, or so that the height of the cut end that extends above a top surface 96 of the substratum plus the thickness of the strainer is equal to the thickness of the floor. The strainer 16, adaptor 18, and/or barrel 102 may be removed to allow cutting of the floor. However, any other cut height may be used when installing the floor substrate above the concrete such that an opening in the floor substrate provides access to the inner surface of the drain conduit.

Once the cover is cut to the desired height, the floor 12 is installed with an opening 64 in the floor disposed around the drain assembly. In some applications, it may be possible to install the floor prior to cutting the cover 60. Further, in some applications, such as in garages and basements, the top surface of the cement or concrete substratum 92 is the top surface 66 of the floor.

In the exemplary embodiment illustrated by FIGS. 22A and 22B, the strainer 16 and the adaptor 18 are assembled as part of the drain assembly 10, and underneath the cover 60, prior to application of the substratum. The adaptor 18 is not secured to the drain assembly at this point. In another embodiment, the strainer 16 and the adaptor 18 are assembled to the rest of the drain assembly after the cover 60 is cut.

Referring to FIGS. 22C and 22D, once the cover has been cut, the barrel 102 is adjusted relative to the base, such that the adaptor 18 can be installed in the barrel 102 with the strainer 16 aligned with the floor. Once the barrel 102 is adjusted, the adaptor 18 is inserted through the cover 60 and into the barrel 102. The strainer 16 can be mounted to the adaptor 18 before or after the adapter is installed in the barrel and before or after the adapter 18 is secured to the barrel. The adaptor 18 is slidably disposed and is optionally tiltable in the barrel 102 prior to being secured in the assembly 10. The position of the adaptor 18 in the barrel 102 is adjusted to substantially align the strainer 16 with a top surface 66 of the floor. In an exemplary embodiment, the position of the adaptor 18 along the axis X of the drain pipe 200 is adjustable and an angle α with respect to axis Y of the adaptor. Once the strainer 16 is aligned with the floor 12 the position of the adaptor 18 inside the drain conduit 14 is fixed to set the position of the strainer 16 in substantial alignment with the top surface 66 of the floor.

The position of the adaptor 18 may be fixed in a wide variety of different ways. For example, the adaptor 18 may be fixed with fasteners, adhesive, or the adaptor may include structure for fixing the position of the adaptor in the drain assembly 10. In one exemplary embodiment, the adaptor 18 and the drain assembly 10 are made from plastics that can be welded together by adhesives and/or solvents that are compatible with the plastics. For example, the drain assembly 10 and the adaptor 18 may both be made from polyvinylchloride and may be connected together using PVC adhesives and/or solvents. In another exemplary embodiment, the adaptor 18 includes an expandable portion 88 that expands radially outward into contact with the inner surface 20 of the drain conduit 14 to secure the adaptor to the drain conduit (See the adaptor illustrated by FIGS. 11A and 11B).

The foregoing description of the preferred embodiments of the present invention has been presented for purposes of illustration and description. It is not intended to be exhaustive or to limit the invention to the precise form disclosed. Modifications or variations are possible in light of the above teachings. Drain systems in accordance with the present invention may include any combination or sub-combination of the features or concepts disclosed by the present application.

The embodiments were chosen and described to illustrate the principles of the invention and its practical application. It is clear that modifications and variations are within the scope of the invention as determined by the appended claims. The drawings and preferred embodiments do not and are not intended to limit the ordinary meaning of the claims in their fair and broad interpretation in any way.

What is claimed:

1. A method of installing a drain in a floor comprising the steps of:
    pouring a hardenable substratum around a conduit, the conduit having an inner surface that defines a fluid flow path and an outer surface opposite the inner surface;
    installing a floor substrate above the substratum such that an opening in the floor substrate provides access to the inner surface of the drain conduit;
    inserting an adaptor into the drain conduit, the adaptor being connected to a strainer at a top portion of the adaptor; and
    adjusting a position of the adaptor in the drain conduit to substantially align the strainer with a top surface of the floor substrate, wherein the adjusting step occurs after the substratum hardens into a hardened substratum.

2. The method of claim 1, wherein the substratum partially defines the top surface of the floor.

3. The method of claim 1 further comprising the step of connecting the strainer to the adaptor, wherein the connecting step is performed prior to the inserting step.

4. The method of claim 3, wherein the inserting step is performed prior to the adjusting step.

5. The method of claim 3 further comprising attaching a removable body to the strainer, wherein the attaching step is performed prior to the inserting step.

6. The method of claim 5 further comprising, after the attaching step, abutting an end portion of the removable body against a top surface of the floor substrate, wherein the end portion of the removable body extends radially outwardly beyond an edge of the strainer.

7. The method of claim 6, wherein the abutting step is performed simultaneously with the adjusting step.

8. The method of claim 6 further comprising the step of applying an adhesive to the adaptor prior to the inserting step.

9. The method of claim 8, further comprising the step of positionally fixing the adaptor relative to the conduit, such that after the adaptor is positionally fixed, the strainer is aligned with the top surface of the floor substrate.

10. The method of claim 1 further comprising, after the pouring step, hardening the hardenable substratum to form the hardened substratum, wherein the hardenable substratum is cement or concrete.

11. The method of claim 1 further comprising the step of applying an adhesive to the adaptor prior to the inserting step.

12. The method of claim 11, further comprising the step of positionally fixing the adaptor relative to the conduit, such that after the adaptor is positionally fixed, the strainer is aligned with the top surface of the floor substrate.

\* \* \* \* \*